United States Patent
Lewis et al.

(10) Patent No.: US 11,392,688 B2
(45) Date of Patent: Jul. 19, 2022

(54) DATA TRANSFER IN SECURE PROCESSING ENVIRONMENTS

(71) Applicant: Google LLC, Mountain View, CA (US)

(72) Inventors: Justin Lewis, Mountain View, CA (US); Scott Davies, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/320,022

(22) PCT Filed: Mar. 21, 2018

(86) PCT No.: PCT/US2018/023564
§ 371 (c)(1),
(2) Date: Jan. 23, 2019

(87) PCT Pub. No.: WO2019/182586
PCT Pub. Date: Sep. 26, 2019

(65) Prior Publication Data
US 2021/0357496 A1    Nov. 18, 2021

(51) Int. Cl.
*G06F 21/53* (2013.01)
*G06F 16/432* (2019.01)
(Continued)

(52) U.S. Cl.
CPC .......... *G06F 21/53* (2013.01); *G06F 9/44505* (2013.01); *G06F 16/433* (2019.01);
(Continued)

(58) Field of Classification Search
CPC .... G06F 21/53; G06F 9/44505; G06F 16/433; G06F 2221/2149; H04L 67/20; G06Q 30/0619; G10L 15/22
See application file for complete search history.

(56) References Cited

U.S. PATENT DOCUMENTS

2010/0094707 A1    4/2010  Freer
2014/0007187 A1*   1/2014  Harrison ............. H04N 21/812
                                                      726/1
(Continued)

FOREIGN PATENT DOCUMENTS

EP      3 179 472 A1    6/2017
JP      2013174644 A    9/2013
(Continued)

OTHER PUBLICATIONS

"Walmart and Google to offer voice-enabled shopping", BBC News, Aug. 23, 2017 (10 pages).
(Continued)

*Primary Examiner* — Mohammad W Reza
(74) *Attorney, Agent, or Firm* — Dority & Manning, P.A.

(57) ABSTRACT

Data transfer in a secure processing environment is provided. A digital assistant can receive audio input detected by a microphone of a computing device. The digital assistant can determine, based on the audio input, to invoke a third-party application associated with the computing device. The digital assistant can generate, responsive to the determination to invoke the third-party application, a packaged data object. The digital assistant can forward, to the third-party application invoked by the digital assistant component to execute in a secure processing environment on the computing device, the packaged data object. The third-party application can transmit, responsive to a digital component request triggered in the third-party application, the packaged data object to a digital component selector to execute a real-time selection process based on the packaged data object.

20 Claims, 9 Drawing Sheets

(51) Int. Cl.
G06F 9/445 (2018.01)
H04L 67/53 (2022.01)
G06Q 30/06 (2012.01)
G10L 15/22 (2006.01)

(52) U.S. Cl.
CPC ...... *H04L 67/20* (2013.01); *G06F 2221/2149* (2013.01); *G06Q 30/0619* (2013.01); *G10L 15/22* (2013.01)

(56) References Cited

U.S. PATENT DOCUMENTS

| | | |
|---|---|---|
| 2014/0222436 A1 | 8/2014 | Binder et al. |
| 2015/0026212 A1 | 1/2015 | Fink et al. |
| 2015/0188956 A1* | 7/2015 | Chauhan .................. H04L 29/06 726/7 |
| 2017/0092278 A1 | 3/2017 | Evermann et al. |
| 2017/0110130 A1 | 4/2017 | Sharifi et al. |
| 2017/0110144 A1 | 4/2017 | Sharifi et al. |
| 2017/0132019 A1 | 5/2017 | Karashchuk et al. |
| 2017/0139879 A1 | 5/2017 | Sharifi et al. |
| 2017/0358301 A1 | 12/2017 | Raitio et al. |
| 2019/0034542 A1* | 1/2019 | Ming ...................... G10L 15/22 |

FOREIGN PATENT DOCUMENTS

| | | | | |
|---|---|---|---|---|
| JP | 2016505954 A | 2/2016 | | |
| WO | WO-2014076442 A1 * | 5/2014 | ........... | G06Q 10/101 |
| WO | WO2014109344 A1 | 1/2017 | | |

OTHER PUBLICATIONS

Abrams, Help users find, interact & re-engage with your app on the Google Assistant, Google Developers Blog, Nov. 15, 2017, 16 pages.
Albrecht, "Alexa, How Can You Be Used in Restaurants?", the spoon, Dec. 10, 2017, 6 pages.
Amazon, "Echo Look | Hands-Free Camera and Style Assistant", reprinted from https://www.amazon.com/gp/product/B0186JAEWK?ref%5F=cm%5Fsw%5Fr%5Ffa%5Fdp%5Ft2%5FC5oazbJTKCB18&pldnSite=1 on Aug. 22, 2017 (7 pages).
Barr, "AWS DeepLens—Get Hands-On Experience with Deep Learning Wth Our New Video Camera", AWS News Blog, Nov. 29, 2017, 11 pages.
Broussard, Mitchel, "Chatbot-Like Siri Patent Includes Intelligent Image, Video, and Audio Recognition within Messages", MacRumors, May 11, 2017 (7 pages).
Buckland et al., "Amazon's Alexa Takes Open-Source Route to Beat Google Into Cars", Bloomberg, Feb. 27, 2018, 6 pages.
Chen, Lulu Yilun, "Alibaba Challenges Google, Amazon With New Echo-Like Device", Bloomberg Technology, Jul. 5, 2017 (3 pages).
Clover, Juli, "Amazon and Google Want to Turn Their Smart Home Speakers Into Telephone Replacements", MacRumors, Feb. 15, 2017 (5 pages).
Coberly, "Apple patent filing reveals potential whispering Siri functionality", Techspot, Dec. 14, 2017, 4 pages.
Collins, et al., "Can Twitter Save Itself?", cnet, Apr. 26, 2017, reprinted from https://www.cnet.com/news/twitter-q1-2017-earnings/ on Aug. 22, 2017 (2 pages).
Crist, Ry, "Logitech Harmony's Alexa Skill just got a whole lot better", cnet, Jul. 13, 2017 (2 pages).
Estes, "Amazon's Newest Gadget Is a Tablet That's Also an Echo", Gizmodo, Sep. 19, 2017, 3 pages.
Foghorn Labs, 10 Tips to Improve the Performance of Google Product Listing Ads, printed from Internet address: http://www.foghornlabs.com/2012/11/21/product-listing-ads-best-practices/, on Mar. 18, 2013, 5 pages.
Forrest, Conner, "Essential Home wants to be bridge between Amazon's Alexa, Apple's Siri, and Google Assistant", TechRepublic, May 31, 2017 (10 pages).
Foxx, Chris, "Apple reveals HomePod smart speaker", BBC News, Jun. 5, 2017 (6 pages).
Gebhart, Andrew, "Google Assistant is spreading, but it needs its own Echo Dot", cnet, May 20, 2017 (7 pages).
Gebhart, Andrew, "Google Home to the Amazon Echo: 'Anything you can do . . . '", cnet, May 18, 2017 (7 pages).
Gibbs, Samuel, "Your Facebook Messenger app is about to be filled with ads", The Guardian, Jul. 12, 2017 (3 pages).
Golgowski, Nina, "This Burger King Ad Is Trying to Control Your Google Home Device", Huffpost, Apr. 12, 2017 (7 pages).
Google Developers, "GoogleAssistant SDK" reprinted from https://developers.google.com/assistant/sdk/ on Aug. 22, 2017 (4 pages).
Google Inc., Products Feed Specification, printed from Internet address: http://www.support.google.com/merchants/bin/answer.py?hl=en&answer=188494#US, on Mar. 18, 2013, 6 pages.
Google Inc., Supported File Formats, printed from Internet address: http://www.support.google.com/merchants/bin/answer.py?hl=en&answer=160567, on Mar. 18, 2013, 1 page.
Gurman, et al., "Apple Is Manufacturing a Siri Speaker to Outdo Google and Amazon", Bloomberg, May 31, 2017 (5 pages).
Hardwick, Tim, "Facebook Smart Speaker Coming Next Year With 15-inch Touch Panel", MacRumors, Jul. 25, 2017 (5 pages).
Heater, "Amazon Alexa devices can finally tell voices apart", TechCrunch, Oct. 11, 2017, 6 pages.
International Search Report and Written Opinion for PCT Application PCT/US2018/023564 dated Jun. 4, 2018.
Johnston, "Amazon Whirlwind: New Echo, Plus, Spot, Connect, Fire TV Take The Stage", Twice, Sep. 27, 2017, 4 pages.
Kelion, "Amazon revamps Echo smart speaker family", BBC News, Sep. 27, 2017, 11 pages.
Kelion, Leo, "Amazon's race to make Alexa smarter", BBC News, Jul. 28, 2017 (8 pages).
Koetsier, John, "Ads on Amazon Echo: Wendy's, ESPN, and Progressive Among Brands Testing", Forbes, May 11, 2017 (2 pages).
Krishna, "Jim Beam's smart decanter will pour you a shot when you ask", engadget, Nov. 29, 2017, 3 pages.
Lacy, "Improving search and advertising are the next frontiers for voice-activated devices", TechCrunch, Dec. 20, 2017, 13 pages.
Larson, Selena, "Google Home now recognizes your individual voice", CNN Money, San Francisco, California, Apr. 20, 2017 (3 pages).
Lee, Take Two for Samsung's troubled Bixby assistant, BBC News, Oct. 19, 2017, 6 pages.
Lee, Dave, "The five big announcements from Google I/O", BBC News, May 18, 2017 (9 pages).
Lund, Pamela, Mastering Google Product Feeds and Product Listing Ads $2013 Part 1, found at http://www.blueglass.com/blog/mastering-google-product-feeds-and-product-listing-ads-part-1/#comments. Dec. 28, 2013, 17 pages.
Nieva, Richard, "Google Home and eBay can tell you how much that's worth", cnet, Mar. 8, 2017 (3 pages).
Novet, et al., "Amazon is getting ready to bring Alexa to work", CNBC, Nov. 29, 2017, 4 pages.
Palladino, "Garmin teamed up with Amazon to make a tiny Echo Dot for your car", ars Technica, Oct. 17, 2017, 2 pages.
Patently Apple, "Apple Patent Reveals a New Security Feature Coming to Siri", Apr. 4, 2017, reprinted from http://www.patentlyapple.com/patently-apple/2017/04/apple-patent-reveals-a-new-security-feature-coming-to-siri.html, on Aug. 22, 2017 (6 pages).
Patently Mobile, "The Patent behind Google Home's new Feature of Understanding Different Voices in the Home Surfaced Today", Apr. 20, 2017, reprinted from http://www.patentlymobile.com/2017/04/the-patent-behind-google-homes-new-feature-of-understanding-different-voices-in-the-home-surfaced-today.html, on Aug. 22, 2017 (3 pages).
Perez, "Alexa's 'Routines' will combine smart home control with other actions, like delivering your news and weather", TechCrunch, Sep. 28, 2017, 10 pages.
Perez, Sarah, "The first ad network for Alexa Skills shuts down following Amazon's policy changes", Tech Crunch, Jun. 15, 2017 (6 pages).

(56) References Cited

OTHER PUBLICATIONS

Porter, Jon, "Amazon Echo Show release date, price, news and features", Techradar, Jun. 26, 2017 (14 pages).
Pringle, "'I'm sorry to hear that': Why training Siri to be a therapist won't be easy", CBC News, Sep. 24, 2017, 3 pages.
Purcher, Jack, Today Google Home's Virtual Assistant can learn its Owner's voice for Security Reasons like Apple's Patent Pending Idea, Apr. 20, 2017, 4 pages.
Sablich, Justin, "Planning a Trip With the Help of Google Home", New York Times, May 31, 2017 (6 pages).
Seifert, Dan, "Samsung's new virtual assistant will make using your phone easier", The Verge, Mar. 20, 2017 (6 pages).
Sherr, Ian, "IBM built a voice assistant for cybersecurity", cnet, Feb. 13, 2017 (2 pages).
Siegal, Daniel, "IP Attys Load Up Apps' Legal Challenges at 'Silicon Beach'", Law360, Los Angeles, California, Feb. 2, 2017 (4 pages).
Unknown Author, "'Dolphin' attacks fool Amazon, Google voice assistants", BBC News, Sep. 7, 2017, 8 pages.
Willens, Max, "For publishers, Amazon Alexa holds promise but not much money (yet)", Digiday, Jul. 6, 2017 (6 pages).
International Preliminary Report on Patentability, Ch. 1, for PCT Appln. Ser. No. PCT/US2018/023564 dated Oct. 1, 2020 (9 pages).
Office Action for KR Appln. Ser. No. 10-2020-7019191 dated Jun. 29, 2021 (7 pages).

\* cited by examiner

400

DATA TRANSFER IN SECURE PROCESSING ENVIRONMENTS

CROSS-REFERENCES TO RELATED APPLICATIONS

This application claims the benefit of priority as a U.S. National Stage under 35 U.S.C. § 371 of International Patent Application No. PCT/US2018/023564, filed on Mar. 21, 2018 and designating the United States, which is hereby incorporated by reference herein in its entirety.

BACKGROUND

A computing device can launch an application for execution on the computing device. The application executed by the computing device can perform one or more functions. The computing device can limit aspects of the application. It may be challenging for the application to perform certain functions due to the limitations imposed on the application by the computing device.

SUMMARY

The present disclosure is generally directed to data transfer in secure processing environments. Computing devices can establish a secure processing environment, such as a sandboxed computing environment, that limits access or functions of applications executed in the secure processing environment. For example, an application executed in the sandboxed computing environment may be prohibited or blocked from accessing memory addresses outside the sandboxed computing environment. The computing device can execute a third-party application in the sandboxed computing environment to improve the security of the device as well as prevent potentially malicious third-party applications from manipulating or modifying the computing device in an undesired manner. However, third-party applications executed in a secure computing environment may be unable to perform certain functions due to the inability to access or retrieve data stored in a memory address outside the secure processing environment. Thus, it may be challenging or inefficient for third-party applications executed in a sandboxed computing environment to perform functions or processes whose input include data stored in a memory address outside the sandboxed computing environment.

Systems and methods of the present solution provide for data transfer in secure processing environments. For example, a digital assistant component can receive audio input that can include speech. The digital assistant component invokes a third-party application responsive to the audio input. The digital assistant component can further identify prior audio input detected prior to the audio input that resulted in the invocation of the third-party application, and then generate a packaged data object with the prior audio input, a unique identifier for the prior audio input, or other indication of the prior audio input. The digital assistant component, when invoking the third-party application for execution in the secure processing environment, can pass the indication of the prior audio input to the third-party application such that the third-party application can either process the prior audio input or transmit the prior audio input to perform a function.

At least one aspect is directed to a system to transfer data in a secure processing environment. The system can include a data processing system. The data processing system can include one or more processors and memory. The system can include a digital assistant component executed at least partially by the data processing system. The digital assistant component (or data processing system) can receive audio input detected by a microphone of a computing device. The digital assistant component (or data processing system) can determine, based on the audio input, to invoke a third-party application associated with the computing device. The digital assistant component (or data processing system) can generate, responsive to the determination to invoke the third-party application, a packaged data object. The packaged data object can include prior audio input detected by the microphone prior to reception of the audio input that resulted in invocation of the third-party application. The digital assistant component can forward, to the third-party application invoked by the digital assistant component to execute in a secure processing environment on the computing device, the packaged data object. The third-party application can transmit, responsive to a digital component request triggered in the third-party application, the packaged data object to a digital component selector to execute a real-time content selection process based on the packaged data object.

At least one aspect is directed to a method of transferring data in a secure processing environment. The method can include a digital assistant component receiving audio input detected by a microphone of a computing device. The digital assistant component can be executed at least partially by a data processing system comprising one or more processors and memory. The method can include the data processing system determining, based on the audio input, to invoke a third-party application associated with the computing device. The method can include the data processing system generating, responsive to the determination to invoke the third-party application, a packaged data object. The packaged data object can include prior audio input detected by the microphone prior to reception of the audio input that resulted in invocation of the third-party application. The method can include the data processing system forwarding, to the third-party application invoked by the digital assistant component to execute in a secure processing environment on the computing device, the packaged data object. The third-party application can transmit, responsive to a digital component request triggered in the third-party application, the packaged data object to a digital component selector to execute a real-time digital component selection process based on the packaged data object.

At least one aspect is directed to a system to transfer data in a processing environment. The system can include a data processing system having one or more processors and memory. The system can include a digital assistant component executed at least partially by the data processing system. The data processing system can receive audio input detected by a microphone of a computing device. The data processing system can determine, based on the audio input, to invoke a third-party application associated with the computing device. The data processing system can generate, responsive to the determination to invoke the third-party application, a unique identifier corresponding to prior audio input detected by the microphone prior to reception of the audio input that resulted in invocation of the third-party application. The data processing system can forward, to the third-party application invoked by the digital assistant component to execute on the computing device, the unique identifier. The third-party application can transmit, responsive to a content request triggered in the third-party application, the unique identifier to the data processing system. The data processing system can identify, using the unique identifier received from the third-party application, the prior audio input. The data processing system can provide, to a digital component selector, the prior audio input as input for a real-time digital component selection process.

At least one aspect is directed to a method of transferring data in a processing environment. The method can be performed by a digital assistant component executed at least partially by a data processing system comprising one or more processors and memory. The method can include the digital assistant component receiving audio input detected by a microphone of a computing device. The method can include the data processing system determining, based on the audio input, to invoke a third-party application associated with the computing device. The method can include the data processing system generating, responsive to the determination to invoke the third-party application, a unique identifier corresponding to prior audio input detected by the microphone prior to reception of the audio input that resulted in invocation of the third-party application. The method can include the data processing system forwarding, to the third-party application invoked by the digital assistant component to execute on the computing device, the unique identifier. The third-party application can transmit, responsive to a content request triggered in the third-party application, the unique identifier to the data processing system. The data processing system can identify, using the unique identifier received from the third-party application, the prior audio input. The data processing system can provide, to a digital component selector, the prior audio input as input for a real-time digital component selection process.

At least one aspect is directed to a system to transfer data in a secure processing environment. The system can include a third-party application. The third-party application can execute in a secure processing environment managed by a computing device. The computing device can include one or more processors and memory. The third-party application can include an application programming interface to interface with a local digital assistant component. The local digital component can be in communication with a remote digital assistant component via a communication channel to processes input audio signals to invoke the third-party application. The third-party application can receive, from the local digital assistant component, an indication of prior audio input detected by a microphone of the computing device prior to reception of audio input that resulted in the invocation of the third-party application. The third-party application can store, in the secure processing environment, the indication of the prior audio input. The third-party application can generate, responsive to an event, a content request. The third-party application can retrieve, from the secure processing environment responsive to the event, the indication of the prior audio input stored in the secure processing environment and received from the local digital assistant via the application programming interface. The third-party application can provide, to a digital component selector, the content request and the indication of the prior audio input. The digital component selector can execute a real-time content selection process based on the content request and the indication of the prior audio input.

At least one aspect is directed to a method of transferring data in a processing environment. The method can be performed by a third-party application. The third-party application can execute in a secure processing environment managed by a computing device. The computing device can include one or more processors and memory. The third-party application can include an application programming interface to interface with a local digital assistant component. The local digital component can be in communication with a remote digital assistant component via a communication channel to processes input audio signals to invoke the third-party application. The method can include the third-party application receiving, from the local digital assistant component, an indication of prior audio input detected by a microphone of the computing device prior to reception of audio input that resulted in the invocation of the third-party application. The method can include the third-party application storing, in the secure processing environment, the indication of the prior audio input. The method can include the third-party application generating, responsive to an event, a content request. The method can include the third-party application retrieving, from the secure processing environment responsive to the event, the indication of the prior audio input stored in the secure processing environment and received from the local digital assistant via the application programming interface. The method can include the third-party application providing, to a digital component selector, the content request and the indication of the prior audio input. The digital component selector can execute a real-time content selection process based on the content request and the indication of the prior audio input At least one aspect is directed to a system to transfer data in a secure processing environment. The system can include a computing device having one or more processors and memory. The system can include a secure processing environment managed by the one or more processors in at least a portion of the memory of the computing device. The system can include a local digital assistant component executed by the one or more processors of the computing device. The local digital assistant component can be in communication with a remote digital assistant component via a communication channel. The local digital assistant component can identify audio input detected by a microphone of the computing device. The local digital assistant component can invoke, based on the audio input, a third-party application on the computing device. The local digital assistant component can obtain, responsive to invocation of the third-party application, an indication of prior audio input detected by the microphone prior to reception of the audio input that resulted in the invocation of the third-party application. The local digital assistant component can forward, to the third-party application invoked by the local digital assistant component to execute in a secure processing environment on the computing device, the indication of the prior audio input. The third-party application can transmit, responsive to a content request triggered in the third-party application, the indication of the prior audio input to a digital component selector. The content selector can execute a real-time digital component selection process based on the indication of the prior audio input.

At least one aspect is directed to a method of transferring data in a secure processing environment. The method can be performed by a computing device comprising one or more processors and memory. The method can include the computing device establishing a secure processing environment in at least a portion of the memory of the computing device. The method can include a local digital assistant component executed by the computing device identifying audio input detected by a microphone of the computing device. The method can include the local digital assistant component invoking, based on the audio input, a third-party application on the computing device. The method can include the local digital assistant component obtaining, responsive to invocation of the third-party application, an indication of prior audio input detected by the microphone prior to reception of the audio input that resulted in invocation of the third-party application. The method can include the local digital assistant component forwarding, to the third-party application invoked by the local digital assistant component to execute in a secure processing environment on the computing device, the indication of the prior audio input. The third-party application can transmit, responsive to a content request triggered in the third-party application, the indication of the prior audio input to a digital component selector. The digital component selector can execute a real-time content selection process based on the indication of the prior audio input.

At least one aspect is directed to method that includes receiving, at a virtual assistant, a request from a user. The method can include interacting, by the virtual assistant and with the user, concerning the request. The method can include sending, by the virtual assistant and based on the interaction, the user to a first resource. The method can include generating, by the virtual assistant, a data object representative of the interaction with the user leading to the sending. The method can include forwarding, by the virtual assistant, the data object to the first resource.

At least one aspect is directed to a method that includes receiving, at a virtual assistant, a request from a user. The method can include interacting, by the virtual assistant and with the user, concerning the request. The method can include sending, by the virtual assistant and based on the interaction, the user to a first resource. The method can include generating, by the virtual assistant, a data object representative of the interaction with the user leading to the sending. The method can include generating, by the virtual assistant, an identifier identifying the interaction. The method can include forwarding, by the virtual assistant, the identifier to the first resource. The method can include forwarding, by the virtual assistant, the data object to a server remote from the resource.

At least one aspect is directed to a computer-readable medium (which may be a non-transitory computer-readable medium although this aspect is not limited to this) storing instructions that, when executed by a processing system comprising one or more processors, cause the processing system to perform operations comprising a method according to any aspect or implementation described herein. At least one aspect is directed to a processing system comprising one or more processors coupled to a memory storing instructions that, when executed by the one or more processors, cause the processing system to perform operations comprising a method according to any aspect or implementation described herein.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
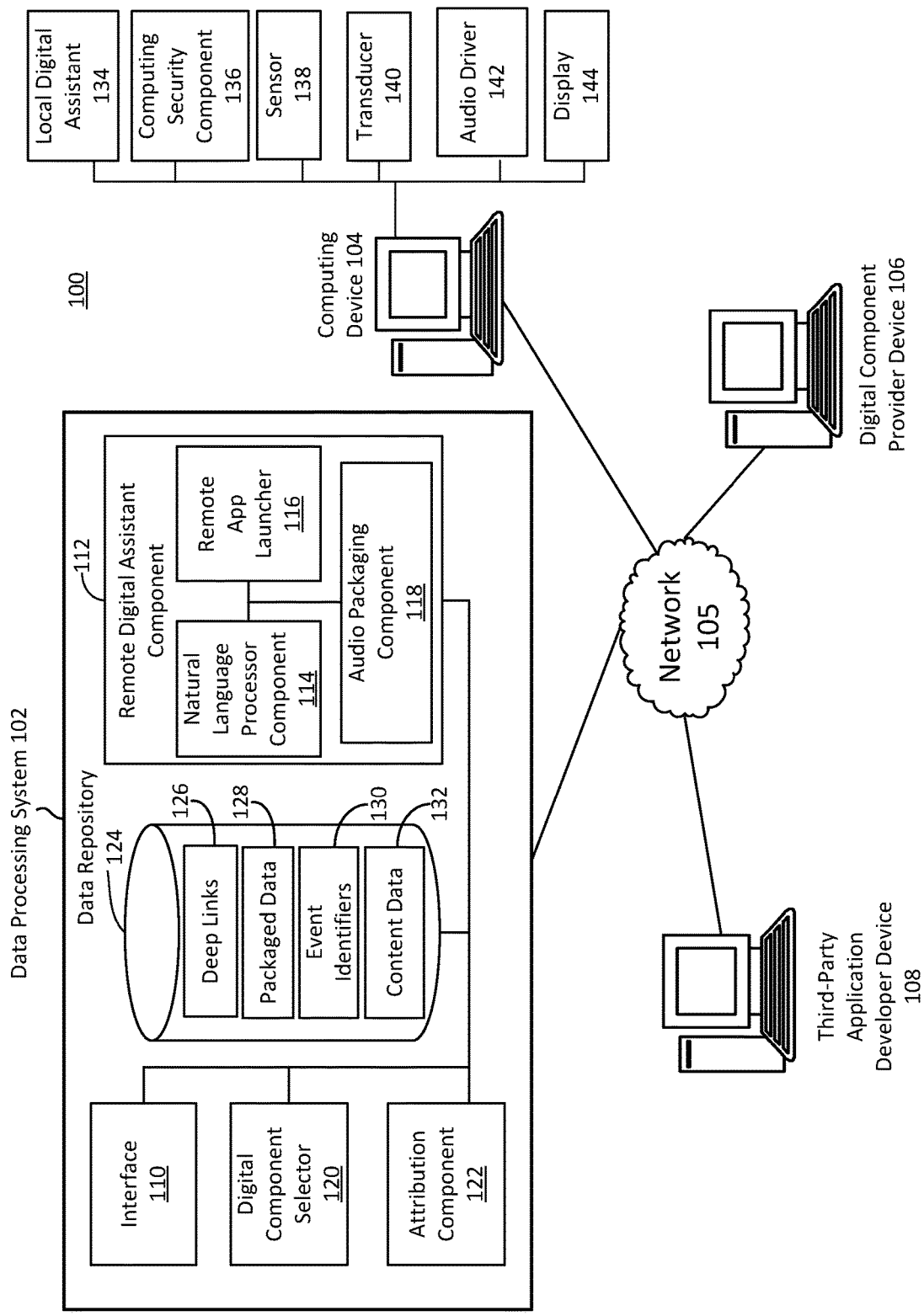
FIG. 1 is an illustration of a system to transfer data in a secure processing environment, in accordance with an example.

Following below are more detailed descriptions of various concepts related to, and implementations of, methods, apparatuses, and systems of transferring data in a secure processing environment. The various concepts introduced above and discussed in greater detail below may be implemented in any of numerous ways.

The present disclosure is generally directed to data transfer in secure processing environments. Computing devices can establish a secure processing environment, such as a sandboxed computing environment, that limits access or functions of applications executed in the secure processing environment. For example, an application executed in the sandboxed computing environment may be prohibited or blocked from accessing memory addresses outside the sandboxed computing environment. The computing device can execute a third-party application in the sandboxed computing to improve the security of the device as well as prevent potentially malicious third-party applications from manipulating or modifying the computing device in an undesired manner. However, third-party applications executed in a secure computing environment may be unable to perform certain functions due to the inability to access or retrieve data stored in a memory address outside the secure processing environment. Thus, it may be challenging or inefficient for third-party applications executed in a sandboxed computing environment to perform functions or processes whose input include data stored in a memory address outside the sandboxed computing environment.

Systems and methods of the present solution provide for data transfer in secure processing environments. For example, a digital assistant component can receive audio input that can include speech. The digital assistant component invokes a third-party application responsive to the audio input. The digital assistant component can further identify prior audio input detected prior to the audio input that resulted in the invocation of the third-party application, and then generate a packaged data object with the prior audio input, a unique identifier for the prior audio input, or other indication of the prior audio input. The digital assistant component, when invoking the third-party application for execution in the secure processing environment, can pass the indication of the prior audio input to the third-party application such that the third-party application can either process the prior audio input or transmit the prior audio input to perform a function.

For example, it can be challenging to select digital components to provide to a client computing device. For example, it can be challenging or inefficient to select digital components in real-time that are relevant without introducing latency or delay, or utilizing excessive computational resources. Indeed, performing a real-time content selection can utilize excessive computing resources, such as processor and memory resources, network bandwidth, or remote procedure calls due to the large number of potential digital components that are available, variables in the digital component selection process, and distributed computing architecture of a data processing system. Furthermore, in a voice-driven computing environment, such as with a personal digital assistant, the data processing system may have limited access to input that can drive a digital component selection process, as compared to a web-based search query environment. This limited access to information can be further reduced when a third-party application executing a sandboxed computing environment attempts to make the request for the digital component.

Systems and methods of the present technical solution allow for data transfer in a secure processing environment that improves the real-time selection of relevant digital components while reducing computing resource utilization, network bandwidth, or remote procedure calls. For example, the systems and methods of the present technical solution provide a digital assistant component that can securely interface with a third-party application launched in a sandboxed computing environment in order to provide additional audio context in a tokenized format to allow the third-party application to generate a digital component request that includes the additional audio context. When the digital assistant launches the third-party application, the digital assistant can pass along the context of the conversation that led the user to the third-party application.

The third-party application launched by the digital assistant can generate a request for a digital component that includes the audio context associated with a prior interaction with the digital assistant component that either resulted in the launching of the third-party application, or occurred prior to the launching of the third-party application. The data processing system can use this audio context, along with additional selection parameters or criteria, such as network activity, historical network activity, location, or keywords associated with the third-party application itself, to perform a real-time digital component selection process.

In an illustrative example, a user may begin a voice-driven communication with a digital assistant. The first query from the user can be "I need to buy something to wear for my graduation this Sunday." The digital assistant can respond with "What would you like to buy?". The user can query "Shoes". The digital assistant can respond with "What type of shoes?" The user can state "Show me some formal dress shoes." At this point, the digital assistant can launch or invoke a third-party application. The digital assistant component can perform an application selection process to identify a deep-link for an application that is responsive to the user's query. The third-party application can be an application for a large clothing retailer that sells many different types of clothing and apparel. At this time, the digital assistant component can pass to the third-party application an indication of the audio input that resulted in the launching of the third-party application as well as the prior audio input that occurred prior to the user query that resulted in the launching of the application. The prior indication of the audio input can be a serialized opaque token (e.g., a data structure that cannot be parsed by the third-party application), a unique identifier (e.g., a unique identifier that maps, such as via a hash table, to the prior audio context stored on a server), event identifiers that indicate events in the conversation, or a packaged data object that includes the conversation context. For example, when the digital assistant launches the third-party application, the conversation can be packaged as a data object. The conversation can then be serialized and sent directly through the third-party application to a content selector. In some examples, the digital assistant can send the conversation or conversation context to a server, and receive a unique identifier. This unique identifier can then be sent to the third-party application, which sends the unique identifier along with the content request.

The third-party application can trigger a digital component request, such as a content request or a request for supplemental content. The third-party application can include, with the content request, the indication of the prior audio input to allow a digital component selector (e.g., a content selector) to select a content item or supplemental content item using the prior audio input (e.g., based on keywords such as graduation, Sunday, buy, or formal dress shoes). The digital component selector is able to make use of the prior audio input when selecting the content item or supplemental content item, and this reduces the time delay in selecting the content item or supplemental content item and reduces the computing resources expended in selecting the content item or supplemental content item. The selected digital component can be provided to the computing device for presentation via the third-party application. Should the user interact with the selected digital component, the data processing system can attribute the interaction to the digital assistant that provided the prior audio input, thereby indicating a performance of the digital assistant. Thus, interactions with the digital component such as impressions, clicks, and conversions can be attributed to the digital assistant in addition to the third-party application.

FIG. 1 illustrates an example system 100 to transfer data in a secure processing environment. The system 100 can include digital component selection infrastructure. The system 100 can include a data processing system 102. The data processing system 102 can communicate with one or more of a digital component provider device 106 (e.g., content provider device), third-party application developer device 108, or client computing device 104 via a network 105. The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be presented, output, rendered, or displayed on at least one computing device 104, such as a laptop, desktop, tablet, digital assistant, personal digital assistant, smartwatch, wearable device, smart phone, portable computers, or speaker. For example, via the network 105 a user of the computing device 104 can access information or data provided by a third-party application developer device 108 or digital component provider device 106. The computing device 104 may or may not include a display; for example, the computing device may include limited types of user interfaces, such as a microphone and speaker. In some cases, the primary user interface of the computing device 104 may be a microphone and speaker.

The network 105 can include or constitute a display network, e.g., a subset of information resources available on the internet that are associated with a content placement or search engine results system, or that are eligible to include third party digital components. The network 105 can be used by the data processing system 102 to access information resources such as web pages, web sites, domain names, or uniform resource locators that can be presented, output, rendered, or displayed by the client computing device 104. For example, via the network 105 a user of the client computing device 104 can access information or data provided by the digital component provider device 106 or the third-party application developer device 108.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include at least one data processing system 102. The data processing system 102 can include at least one logic device such as a computing device having a processor to communicate via the network 105, for example with the computing device 104, the digital component provider device 106 (or content provider device), or the third-party application developer device 108 (or third-party application developer). The data processing system 102 can include at least one computation resource, server, processor or memory. For example, the data processing system 102 can include a plurality of computation resources or servers located in at least one data center. The data processing system 102 can include multiple, logically-grouped servers and facilitate distributed computing techniques. The logical group of servers may be referred to as a data center, server farm or a machine farm. The servers can also be geographically dispersed. A data center or machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralization of all or some of the data processing system 102 components, including servers and storage systems, and coupling them with advanced system management tools allows more efficient use of server resources, which saves power and processing requirements and reduces bandwidth usage.

The computing device 104 can include, interface, or otherwise communicate with one or more of at least one local digital assistant 134, at least one computing security component 136, at least one sensor 138, at least one transducer 140, at least one audio driver 142, or at least one display 144. The sensor 138 can include, for example, a camera, an ambient light sensor, proximity sensor, temperature sensor, accelerometer, gyroscope, motion detector, GPS sensor, location sensor, microphone, video, image detection, or touch sensor. The transducer 140 can include or be part of a speaker or a microphone. The audio driver 142 can provide a software interface to the hardware transducer 140. The audio driver 142 can execute the audio file or other instructions provided by the data processing system 102 to control the transducer 140 to generate a corresponding acoustic wave or sound wave. The display 144 can include one or more hardware or software component configured to provide a visual indication or optical output, such as a light emitting diode, organic light emitting diode, liquid crystal display, laser, or display 935.

The local digital assistant 134 can include one or more processors (e.g., processor 910), logic array, or memory. The local digital assistant 134 can detect a keyword and perform an action based on the keyword. The local digital assistant 134 can filter out one or more terms or modify the terms prior to transmitting the terms to the data processing system 102 (e.g., remote digital assistant 112) for further processing. The local digital assistant 134 can convert the analog audio signals detected by the microphone into a digital audio signal, and transmit one or more data packets carrying the digital audio signal to the data processing system 102 via the network 105. In some cases, the local digital assistant 134 can transmit data packets carrying some or all of the input audio signal responsive to detecting an instruction to perform such transmission. The instruction can include, for example, a trigger keyword or other keyword or approval to transmit data packets comprising the input audio signal to the data processing system 102.

The local digital assistant 134 can perform a pre-filtering or pre-processing on the input audio signal to remove certain frequencies of audio. The pre-filtering can include filters such as a low-pass filter, high-pass filter or a bandpass filter. The filters can be applied in the frequency domain. The filters can be applied using a digital signal processing technique. The filter can be configured to keep frequencies that correspond to a human voice or human speech, while eliminating frequencies that fall outside the typical frequencies of human speech. For example, a bandpass filter can be configured to remove frequencies below a first threshold (e.g., 70 Hz, 75 Hz, 80 Hz, 85 Hz, 90 Hz, 95 Hz, 100 Hz, or 105 Hz) and above a second threshold (e.g., 200 Hz, 205 Hz, 210 Hz, 225 Hz, 235 Hz, 245 Hz, or 255 Hz). Applying a bandpass filter can reduce computing resource utilization in downstream processing. In some cases, the local digital assistant 134 on the computing device 104 can apply the bandpass filter prior to transmitting the input audio signal to the data processing system 102, thereby reducing network bandwidth utilization. However, based on the computing resources available to the computing device 104 and the available network bandwidth, it may be more efficient to provide the input audio signal to the data processing system 102 to allow the data processing system 102 to perform the filtering.

The local digital assistant 134 can apply additional pre-processing or pre-filtering techniques such as noise reduction techniques to reduce ambient noise levels that can interfere with natural language processor. Noise reduction techniques can improve accuracy and speed of natural language processor, thereby improving the performance of the data processing system 102 and manage rendering of a graphical user interface provided via display 144.

The local digital assistant 134 can determine to invoke or launch an application on the computing device 104. The local digital assistant 134 can receive an instruction or command from the remote digital assistant 112 to invoke or launch an application on the computing device 140. The local digital assistant 134 can receive a deep-link or other information to facilitate launching of the application on the computing device 104, or otherwise executing the application on the computing device 104.

The local digital assistant 134 (or local digital assistant component) can launch an application in a secure processing environment. The computing device 104 can include a computing security component 136 that establishes, manages, or maintains a secure processing environment on the computing device. For example, the computing security component 136 can establish, manage or maintain a secure processing environment, such as a siloed computing environment, sometimes referred to as a sandboxed environment, a restricted data-sharing environment, an application isolation environment, or a virtualized environment. When executing in the secure processing environment (e.g., siloed computing environment) established by the computing security component 136, the application may have limited or restricted access to computing resources, such as memory, input/output buffers, or network resources. The application executing in the secure (e.g., siloed or sandboxed) computing environment may be restricted from interacting with one or more other applications, or even one or more instances of the same applications, that may be concurrently executing on the computing device. During execution, the application executing in the secure (e.g., siloed or sandboxed) computing environment may be restricted from interacting with the local digital assistant 134, accessing data files stored on the computing device 104, or requesting some types of data. For example, each siloed instance of an application may have its own memory space, preferences, registry settings, cache, network sockets, etc., and may not have access to—or even necessarily know about—resources of other instances of the application. Due to the restricted or limited access or ability to interact with other applications or memory or files associated with previous instances of the same application, each siloed application or instance of an application may not have access to the context in which the application was launched, or prior contextual information prior to the launch of the application. Thus, if the application transmits a request for a digital component, such as a content item, the data processing system 102 may have to generate additional remote procedure calls or access other resources to obtain contextual information that can be used to generate a response to the request. Aspects of the present disclosure address these constraints, making the process of selecting the digital component faster and more resource-efficient.

The secure processing environment can refer to an access restriction imposed on the third-party application. For example, the third-party application can be assigned limited access, authorization, privileges or rights. The third-party application can otherwise initially lack access to the prior input audio or conversation that resulted in the launching of the third-party application. For example, due to the sequence of operations, the third-party application can be invoked or launched subsequent to the conversation already occurring, therefore the third-party application may not have access to the conversation information. The secure processing environment, in some cases, can refer to the third-party application not having access to some or all of the conversation that resulted in the launching of the third-party application.

The computing device 104 (or client computing device or client device) can be associated with an end user that enters voice queries as audio input into the client computing device 104 (via the sensor 138) and receives audio output in the form of a computer-generated voice that can be provided from the data processing system 102 (or the digital component provider device 106 or the third-party application developer device 108) to the client computing device 104, output from the transducer 140 (e.g., a speaker). The computer-generated voice can include recordings from a real person or computer generated language. The client computing device 104 can provide visual output via a display device 144 communicatively coupled to the computing device 104.

The client computing device 104 can be associated with an end user that provides image or video that can indicate queries as input into the client computing device 104 (via the sensor 138). The end user can receive audio output responsive to the input in the form of a computer-generated voice that can be provided from the data processing system 102 (or the digital component provider device 106 or the third-party application developer device 108) to the client computing device 104, output from the transducer 140 (e.g., a speaker). The end user can receive visual output responsive to the input in the form of a computer-generated graphical user interface that can be provided from the data processing system 102 (or the digital component provider device 106 or the third-party application developer device 108) to the client computing device 104 for output to the display 144). The input detected by the one or more sensors 134 can include one or more of audio input (e.g., acoustic signal), visual input (e.g., image or video data), motion input or other input. The input (e.g., the one or more of audio, image, visual, or motion input) to the computing device 104 can be converted to a digital file and provided to the data processing system 102 for further processing or to generate actions. For example, the input (e.g., the one or more of audio, image, visual, or motion input) to the computing device 104 can trigger the selection of a computer program comprising a third-party application, and the third-party application can provide output that is responsive to the query generated or corresponding to the input (e.g., the one or more of audio, image, visual, or motion input) to the computing device 104.

The computing device 104 can receive an input audio signal detected by a sensor 138 (e.g., microphone) of the computing device 104. The input audio signal can include, for example, a query, question, command, instructions, or other statement provided in a language. The input audio signal can include an identifier or name of a third-party application to which the question or query is directed. For example, the query can include the name of the third-party application followed by the query in order to instruct the data processing system 102 to input the query into the specified third-party application. For example, the input audio signal can include "Launch Weather Application and show the forecast for San Francisco." In some cases, the query may not identify the application, but instead the query can be "What is the weather for San Francisco", and the local digital assistant 134, in communication with the remote digital assistant 112, can select a third-party application to launch and instruct the computing device 104 to launch the third-party application.

The computing device 104 can include, execute, or be referred to as a digital assistant device. The digital assistant device (or computing device 104) can include one or more component of the computing device 104. The digital assistant device can include a graphics driver that can receive display output from the data processing system 102, and render the display output on display 132. The graphics driver can include hardware or software components that control or enhance or how graphics or visual output is displayed on the display 144. The graphics driver can include, for example, a program that controls how the graphic components work with the rest of the computing device 104 (or digital assistant). The local digital assistant 134 can filter the input audio signal to create a filtered input audio signal, convert the filtered input audio signal to data packets, and transmit the data packets to a data processing system comprising one or more processors and memory.

The digital assistant device can include an audio driver 142 and a speaker component (e.g., transducer 140). The pre-processor component 140 to receive an indication of the display output and instruct the audio driver 142 to generate an output audio signal to cause the speaker component (e.g., transducer 140) to transmit an audio output corresponding to the indication of the display output. The audio output can include a text-to-speech representation of the text depicted in textbox 312 in FIG. 3, for example.

The system 100 can include, access, or otherwise interact with at least one third-party application developer device 108. The third-party application developer device 108 can include one or more servers and can be referred to as a third-party application server. The third-party application developer device 108 can be integrated with the data processing system 102, or executed at least partially by the data processing system 102. The third-party application developer device 108 can include at least one logic device such as a computing device having a processor to communicate via the network 105, for example with the computing device 104, the data processing system 102, or the digital component provider device 106. The third-party application developer device 108 can include at least one computation resource, server, processor or memory. For example, third-party application developer device 108 can include a plurality of computation resources or servers located in at least one data center. The third-party application developer device 108 can include one or more component or functionality of the data processing system 102.

The third-party application developer device 108 can include or refer to an app developer, such as an entity that designs, develops, manages, or maintains computer programs that form or provide one or more applications that can be executed by, or used via, a computing device 104. An application can include any type of a computer program, such as a clothing app, game app, augmented reality app, shopping app, weather app, travel app, social networking app, navigation app, chatbot, business apps, educational apps, lifestyle apps, utilities apps, book apps, health and fitness apps, or food and drink apps.

The third-party application developer device 108 can refer to one or more servers of an entity that is different from the entity that administers or provides the data processing system 102. The third-party application developer device 108 can receive computer programs for an app. The third-party application developer device 108 can interface or communicate with the computing device 104 to provide the application functionality. For example, third-party application developer device 108 can execute or run the application in order to interface or interact with a user of the computing device 104. The third-party application developer device 108 can execute on a server remote from the data processing system 102 and computing device 104.

The data processing system 102 can include a content placement system having at least one computation resource or server. The data processing system 102 can include, interface, or otherwise communicate with at least one interface 110. The data processing system 102 can include, interface, or otherwise communicate with at least one remote digital assistant 112. The remote digital assistant 112 can include, interface, or otherwise communicate with at least one natural language processor component 114. The remote digital assistant 112 can include, interface, or otherwise communicate with at least one remote app launcher 116. The remote digital assistant 112 can include, interface, or otherwise communicate with at least one audio packaging component 118. The data processing system 102 can include, interface, or otherwise communicate with at least one digital component selector 120. The data processing system 102 can include, interface, or otherwise communicate with at least one attribution component 122. The data processing system 102 can include, interface, or otherwise communicate with at least one data repository 124. The at least one data repository 124 can include or store, in one or more data structures or databases, deep links 126, packaged data 128, event identifiers 130, or content data 132. The data repository 124 can include one or more local or distributed databases, and can include a database management system.

The deep links 126 can be stored in one or more data structures or data files. The deep links 126 can be stored in a table. The deep links 126 can include links, points, references, or other address or location information of an application that can be executed. A deep link to an application can refer to a uniform resource locator or hyperlink that links to a specific resource, web content, or application. The deep link can include the information used to point to a particular resource or application, and launch the application. In some cases, deep links can include uniform resource identifiers ("URI") that links to a specific location within a mobile application in addition to launching the application. The deep links 126 data structure can include a hash table that maps application names or views of an application to a deep link.

Packaged data 128 can include or be based on audio input. Packaged data 128 can include identifiers or unique identifiers corresponding to audio input. Packaged data 128 can include conversations between an end user and a digital assistant (e.g., local digital assistant 134 and remote digital assistant 112). Packaged data 128 can include a serialized opaque token that captures the conversation (e.g., audio input detected by a sensor 138 of the computing device 104 and responses from the digital assistant). The packaged data 128 can include structured conversation, keywords, terms, or phrases. The packaged data 128 can include timestamps or sequence of the words, phrases, sentences, or aspects of the conversation. The packaged data 128 can be stored in an encrypted format, or unencrypted format.

Event identifiers 130 can refer to aspects of a conversation. Event identifiers 130 can be based on an ontology-driven natural language processing technique. For example, the natural language text can be parsed and transposed into a representation of the meaning of the natural language text, that can be structured around events and their participants as mentioned in the text and known to an ontology model. Queries can then be matched to this meaning representation in anticipation of permutations that may be in the text. These permutations can centrally include over specification (e.g. not listing all synonyms, which non-semantic search engines require their users to do) and more importantly, under specification. For example, an event can be based on a user query to buy clothes, and a response to the query with a options for clothes.

Content data 132 can include, for example, content groups, content selection criteria, digital component objects or other information provided by a digital component provider device 106 or obtained or determined by the data processing system to facilitate content selection. The content data 132 can include, for example, historical performance data. The content data 132 can include digital components for audio output, display output or associated metadata, as well as input audio messages that can be part of one or more communication sessions with the client computing device 104. A digital component (or digital component object) can include, for example, a content item, an online document, audio, images, video, multimedia content, or third-party content.

The interface 110, remote digital assistant 112, natural language processor component 114, remote app launcher 116, audio packaging component 118, digital component selector 120, and attribution component 122 can each include at least one processing unit or other logic device such as programmable logic array engine, or module configured to communicate with the database repository or database 124. The interface 110, remote digital assistant 112, natural language processor component 114, remote app launcher 116, audio packaging component 118, digital component selector 120, and attribution component 122 and data repository 124 can be separate components, a single component, or part of the data processing system 102. The system 100 and its components, such as a data processing system 102, can include hardware elements, such as one or more processors, logic devices, or circuits.

The data processing system 102 can obtain anonymous computer network activity information associated with a plurality of computing devices 104. A user of a computing device 104 can affirmatively authorize the data processing system 102 to obtain network activity information corresponding to the user's computing device 104. For example, the data processing system 102 can prompt the user of the computing device 104 for consent to obtain one or more types of network activity information. The identity of the user of the computing device 104 can remain anonymous and the computing device 104 can be associated with a unique identifier (e.g., a unique identifier for the user or the computing device provided by the data processing system or a user of the computing device). The data processing system can associate each observation with a corresponding unique identifier.

A digital component provider device 106 can provide audio, visual, or multimedia based digital components for presentation by the client computing device 104 as an audio output digital component or visual output digital component. The digital component can be or include a digital component. The digital component can be or include a digital object. The digital component can include a brand name or company name of a good or service. The digital component can be configured for a parametrically driven text to speech technique. The digital component can be configured for text-to-speech (TTS) implementations that convert normal language text into speech. The digital component can be input to an application programming interface that utilizes a speech-synthesis capability to synthesize text into natural-sounding speech in a variety of languages, accents, and voices. The digital component can be coded as plain text or a speech synthesis markup language (SSML). SSML can include parameters that can be set to control aspects of speech, such as pronunciation, volume, pitch, or rate that can form an acoustic fingerprint or native voice.

The digital component provider device 106 can provide selection criteria for the digital component, such as a value, keyword, concept, or other metadata or information to facilitate a content selection process. The digital component provider device 106 can also provide audio based digital components (or other digital components) to the data processing system 102 where they can be stored in the data repository 124. The data processing system 102 can select the audio digital components (or digital components configured for a parametrically driven text, image, or video to speech technique) and provide (or instruct the digital component provider device 106 to provide) the audio digital components to the client computing device 104. The audio based digital components can be exclusively audio or can be combined with text, image, or video data.

The digital component provider device 106 can provide the digital component to the data processing system 102 for storage in the data repository 124 in the content data data structure 132. The data processing system 102 can retrieve the digital component responsive to a request for content or otherwise determining to provide the digital component.

The digital component provider device 106 can establish a digital component campaign (or electronic content campaign). The digital component campaign can be stored as content data 132 in data repository 124. A digital component campaign can refer to one or more content groups that correspond to a common theme. A content campaign can include a hierarchical data structure that includes content groups, digital component data objects (e.g., digital components or digital objects), and content selection criteria. To create a digital component campaign, digital component provider device 106 can specify values for campaign level parameters of the digital component campaign. The campaign level parameters can include, for example, a campaign name, a preferred content network for placing digital component objects, a value of resources to be used for the digital component campaign, start and end dates for the content campaign, a duration for the digital component campaign, a schedule for digital component object placements, language, geographical locations, type of computing devices on which to provide digital component objects. In some cases, an impression can refer to when a digital component object is fetched from its source (e.g., data processing system 102 or digital component provider device 106), and is countable. In some cases, due to the possibility of click fraud, robotic activity can be filtered and excluded, as an impression. Thus, in some cases, an impression can refer to a measurement of responses from a Web server to a page request from a browser, which is filtered from robotic activity and error codes, and is recorded at a point as close as possible to opportunity to render the digital component object for display on the computing device 104. In some cases, an impression can refer to a viewable or audible impression; e.g., the digital component object or digital component is at least partially (e.g., 20%, 30%, 30%, 40%, 50%, 60%, 70%, or more) viewable on a display device of the client computing device 104, or audible via a speaker 136 of the computing device 104. A click or selection can refer to a user interaction with the digital component object, such as a voice response to an audible impression, a mouse-click, touch interaction, gesture, shake, audio interaction, or keyboard click. A conversion can refer to a user taking a desired action with respect to the digital component objection; e.g., purchasing a product or service, completing a survey, visiting a physical store corresponding to the digital component, or completing an electronic transaction.

The digital component provider device 106 can further establish one or more content groups for a digital component campaign. A content group includes one or more digital component objects and corresponding content selection criteria, such as keywords, words, terms, phrases, geographic locations, type of computing device, time of day, interest, topic, or vertical. Content groups under the same content campaign can share the same campaign level parameters, but may have tailored specifications for content group level parameters, such as keywords, negative keywords (e.g., that block placement of the digital component in the presence of the negative keyword on main content), or parameters associated with the content campaign.

To create a new content group, the digital component provider device 106 can provide values for the content group level parameters of the content group. The content group level parameters include, for example, a content group name or content group theme, and bids for different content placement opportunities (e.g., automatic placement or managed placement) or outcomes (e.g., clicks, impressions, or conversions). A content group name or content group theme can be one or more terms that the digital component provider device 106 can use to capture a topic or subject matter for which digital component objects of the content group is to be selected for display. For example, a food and beverage company can create a different content group for each brand of food or beverage it carries, and may further create a different content group for each model of vehicle it carries. Examples of the content group themes that the food and beverage company can use include, for example, "Brand A cola", "Brand B ginger ale," "Brand C orange juice," "Brand D sports drink," or "Brand E purified water." An example content campaign theme can be "soda" and include content groups for both "Brand A cola" and "Brand B ginger ale", for example. The digital component (or digital component object or digital component) can include "Brand A", "Brand B", "Brand C", "Brand D" or "Brand E". The digital component object or digital component can refer to the digital component configured for a parametrically driven text to speech technique.

The digital component provider device 106 can provide one or more keywords and digital component objects to each content group. Keywords can include terms that are relevant to the product or services of associated with or identified by the digital component objects. A keyword can include one or more terms or phrases. For example, the food and beverage company can include "soda," "cola," "soft drink," as keywords for a content group or content campaign that can be descriptive of the goods or services the brand provides. In some cases, negative keywords can be specified by the content provider to avoid, prevent, block, or disable content placement on certain terms or keywords. The content provider can specify a type of matching, such as exact match, phrase match, or broad match, used to select digital component objects.

The digital component provider device 106 can provide one or more keywords to be used by the data processing system 102 to select a digital component object provided by the digital component provider device 106. The digital component provider device 106 can provide additional content selection criteria to be used by the data processing system 102 to select digital component objects. The data processing system 102 can run a content selection process involving multiple content providers 106 responsive to receiving an indication of a keyword of an electronic message.

The digital component provider device 106 can provide one or more digital component objects for selection by the data processing system 102. The data processing system 102 (e.g., via digital component selector 120) can select the digital component objects when a content placement opportunity becomes available that matches the resource allocation, content schedule, maximum bids, keywords, and other selection criteria specified for the content group. Different types of digital component objects can be included in a content group, such as a voice digital component, audio digital component, a text digital component, an image digital component, video digital component, multimedia digital component, or digital component link. Upon selecting a digital component, the data processing system 102 can transmit the digital component object for presentation or rendering on a computing device 104 or display device of the computing device 104. Presenting or rendering can include displaying the digital component on a display device, or playing the digital component via a speaker of the computing device 104. The data processing system 102 can provide instructions to a computing device 104, local digital assistant 134, or third-party application executed by the computing device 104 to present the digital component object. The data processing system 102 can instruct the computing device 104, display 144, or an audio driver 142 of the computing device 104, to generate audio signals, acoustic waves, or visual output. For example, the local digital assistant 134 can present the selected digital component via an audio output while the third-party application executes in the secure processing environment on the computing device 104. In another example, the third-party application executing in the secure computing environment on the computing device 104 can display the selected digital component object via a graphical user interface of the third-party application. In yet another example, the third-party application executing on the computing device 104 can present the selected digital component via an audio output.

The data processing system 102 can include an interface component 110 designed, configured, constructed, or operational to receive and transmit information using, for example, data packets. The interface 110 can receive and transmit information using one or more protocols, such as a network protocol. The interface 110 can include a hardware interface, software interface, wired interface, or wireless interface. The interface 110 can facilitate translating or formatting data from one format to another format. For example, the interface 110 can include an application programming interface that includes definitions for communicating between various components, such as software components.

The data processing system 102 can include an application, script or program installed at the client computing device 104, such as a local digital assistant 134 to communicate input audio signals to the interface 110 of the data processing system 102 and to drive components of the client computing device to render output audio signals or visual output. The data processing system 102 can receive data packets, a digital file, or other signal that includes or identifies an audio input signal (or input audio signal). The computing device 104 can detect the audio signal via the transducer 140, and convert the analog audio signal to a digital file via an analog-to-digital converter. For example, the audio driver 142 can include an analog-to-digital converter component. In some cases, the pre-processor component 140 can convert the audio signals to a digital file that can be transmitted via data packets over network 105.

The remote digital assistant 112 of the data processing system 102 can execute or run an NLP component 114 to receive or obtain the data packets including the input audio signal detected by the sensor 138 of the computing device 104. The data packets can provide a digital file. The NLP component 114 can receive or obtain the digital file or data packets comprising the audio signal and parse the audio signal. For example, the NLP component 114 can provide for interactions between a human and a computer. The NLP component 114 can be configured with techniques for understanding natural language and allowing the data processing system 102 to derive meaning from human or natural language input. The NLP component 114 can include or be configured with technique based on machine learning, such as statistical machine learning. The NLP component 114 can utilize decision trees, statistical models, or probabilistic models to parse the input audio signal. The NLP component 114 can perform, for example, functions such as named entity recognition (e.g., given a stream of text, determine which items in the text map to proper names, such as people or places, and what the type of each such name is, such as person, location, or organization), natural language generation (e.g., convert information from computer databases or semantic intents into understandable human language), natural language understanding (e.g., convert text into more formal representations such as first-order logic structures that a computer module can manipulate), machine translation (e.g., automatically translate text from one human language to another), morphological segmentation (e.g., separating words into individual morphemes and identify the class of the morphemes, which can be challenging based on the complexity of the morphology or structure of the words of the language being considered), question answering (e.g., determining an answer to a human-language question, which can be specific or open-ended), semantic processing (e.g., processing that can occur after identifying a word and encoding its meaning in order to relate the identified word to other words with similar meanings).

The NLP component 114 can convert the audio input signal into recognized text by comparing the input signal against a stored, representative set of audio waveforms (e.g., in the data repository 124) and choosing the closest matches. The set of audio waveforms can be stored in data repository 124 or other database accessible to the data processing system 102. The representative waveforms are generated across a large set of users, and then may be augmented with speech samples from the user. After the audio signal is converted into recognized text, the NLP component 114 matches the text to words that are associated, for example via training across users or through manual specification, with actions that the data processing system 102 can serve. The NLP component 114 can convert image or video input to text or digital files. The NLP component 114 can process, analyze or interpret image or video input to perform actions, generate requests, or select or identify data structures.

The audio input signal can be detected by the sensor 138 or transducer 140 (e.g., a microphone) of the client computing device 104. Via the transducer 140, the audio driver 142, or other components the client computing device 104 can provide the audio input signal to the data processing system 102 (e.g., via the network 105) where it can be received (e.g., by the interface 110) as a digital file or digital format and provided to the NLP component 114 or stored in the data repository 124. In some cases, the data processing system 102 can receive image or video input signals, in addition to, or instead of, input acoustic signals. The data processing system 102 can process the image or video input signals using, for example, image interpretation techniques, computer vision, a machine learning engine, or other techniques to recognize or interpret the image or video to convert the image or video to a digital file. The one or more image interpretation techniques, computer vision techniques, machine learning techniques can be collectively referred to as imaging techniques. The data processing system 102 (e.g., the NLP component 114) can be configured with the imaging techniques, in addition to, or instead of, audio processing techniques.

The NLP component 114 can obtain the input audio signal. From the input audio signal, the NLP component 114 can identify at least one request or at least one trigger keyword corresponding to the request. The request can indicate intent or subject matter of the input audio signal. The trigger keyword can indicate a type of action likely to be taken. For example, the NLP component 114 can parse the input audio signal to identify at least one request to leave home for the evening to attend dinner and a movie. The trigger keyword can include at least one word, phrase, root or partial word, or derivative indicating an action to be taken. For example, the trigger keyword "go" or "to go to" from the input audio signal can indicate a need for transport. In this example, the input audio signal (or the identified request) does not directly express an intent for transport, however the trigger keyword indicates that transport is an ancillary action to at least one other action that is indicated by the request.

The NLP component 114 can parse the input audio signal to identify, determine, retrieve, or otherwise obtain the request and the trigger keyword. For instance, the NLP component 114 can apply a semantic processing technique to the input audio signal to identify the trigger keyword or the request. The NLP component 114 can apply the semantic processing technique to the input audio signal to identify a trigger phrase that includes one or more trigger keywords, such as a first trigger keyword and a second trigger keyword. For example, the input audio signal can include the sentence "I'm bored, suggest something fun to do." The NLP component 114 can determine that the input audio signal includes a request to identify entertainment options. The data processing system 102 can respond with a first output signal "Would you like to play a video game?" The second input audio signal can be "Yes, what do you suggest?" The second output audio signal can be "Would you like to play a role playing game, a racing game, or a puzzle game." The third input audio signal can be "I would like to play a puzzle game". The third output audio signal can be "How about a crossword puzzle or Sudoku?" Sudoku can refer to a logic-based, combinatorial number-placement puzzle. The fourth input audio signal can be "Let's play Sudoku." The NLP component 114 can determine that the fourth input audio signal includes an application identifier and a query or request. The application identifier can refer to an application identifier or name that maps to a link to the application. The NLP component 114 can apply a semantic processing technique, or other natural language processing technique, to the data packets comprising the sentence to identify the application identifier "Sudoku" and the query "play". The data processing system 102 can determine that the fourth audio input resulted in launching of the application, and that the first, second, and third audio inputs and outputs are prior audio input that occurred prior to the audio input that resulted in launching of the application.

The NLP component 114 can filter the input audio signal to identify the application identifier and query. In some cases, the input audios signal can include a query but may not include an application identifier or name of an application. For example, the data packets carrying the input audio signal can include "It would be great if I could get help finding some good restaurants nearby", in which case the NLP component 114 can filter out one or more terms as follows: "it", "would", "be", "great", "if", "I", "could", "get", or "help". By filtering out these terms, the NLP component 114 may more accurately and reliably identify the query or keywords, such as "finding" "good" "restaurants" "nearby" and determine that this is a request to launch a restaurant finder application.

The input audio signal can include an application identifier, such as an identifier for a desired application. The input audio signal can include a unique identifier of the application, the name of the application, or other indication as to which application to launch or invoke. For example, the input audio signal can include the name of an application, such as "Clothing Retailer A". The application identifier can be an alphanumeric identifier.

Thus, the data processing system 102 can receive a data packets corresponding to an input audio signal carrying voice content detected by a sensor 138 or transducer 140 of the computing device 104. The input audio signal can be converted to a digital file by an analog to digital converter (e.g., audio driver 142) of the computing device 104. The data processing system 102 can receive data packets corresponding to the digital file over network 105, and then parse the data packets or digital file to select a computer program comprising an application. For example, the data processing system 102 can include a remote application launcher 116 designed and constructed to select, responsive to the data packets or digital file, a computer program that includes an application for execution by the computing device 104 in a secure processing environment established and maintained on the computing device 104.

The remote application launcher 116 (or remote app launcher) can identify keywords, tokens, terms, concepts, or other information in the digital file or prior audio input. The remote application launcher 116 can utilize the natural language processor component 114 to identify keywords, tokens, terms, concepts, or other information in the digital file. The natural language processor component 114 can provide the parsed keyword, token, term or concept to the remote application launcher 116. The remote application launcher 116 can select an application that is responsive to a keyword or concept of the digital file or audio input. The remote application launcher 116 can select an application that maps to the application identifier provided in the input audio signal.

The data processing system 102 (e.g., via NLP component 114 or remote application launcher 116) can determine that the input audio signal includes the application identifier "Clothing Retailer A". The NLP component 114 or remote application launcher 116 can further identify the query in the input audio signal. The NLP component 114 can provide the application identifier to the remote application launcher 116. The remote application launcher 116 can perform a lookup in a deep links data structure 126 to identify an application that maps to the application identifier "Clothing Retailer A". In some cases, the input audio signal may not include an application identifier, but may include a query that indicates a type of application that can provide a response to the query. For example, the deep links data structure 126 can include keywords or other information that describes, for each application, the goods, service or function the application can provide (e.g., restaurant search, video game, clothing). The remote application launcher 116 can use the identifier determined via the deep links data structure 126 to launch, initiate, execute or otherwise activate or invoke the corresponding application, or instance thereof. In some cases, the identifier can include or be associated with a filename or file path, pointer, web address, internet protocol address, uniform resource locator, deep link or other identifying information for the application. For example, the data processing system 102 can determine the Clothing Retailer Application is provided via the third-party application developer device 108, and instruct the third-party application developer device 108 to provide the Clothing Retailer Application for execution on the computing device 104 either directly or via the data processing system 102 (e.g., via the remote application launcher 116). Thus, the data processing system 102 (or remote digital assistant 112 or remote app launcher 116) can identify, via a lookup in a database, a deep-link for the third-party application, and use the deep-link to invoke the third-party application.

The data processing system 102 can determine, from the input audio signal, an application to invoke for the computing device 104. The data processing system 102 can provide an instruction or command to the computing device 104 (e.g., the local digital assistant 134) to launch, execute or invoke the application or an instance of the application. In some cases, prior to launching or causing the launch or execution of the application, the data processing system 102 can determine whether the computing device 104 is authorized to access the application. The data processing system 102 (e.g., via remote application launcher 116) can perform a lookup in the data repository 124 (e.g., deep links data structure 126) with the identifier of the computing device 104 to determine if the computing device 104 is authorized to access the computer program comprising the application. Authorization can be based on a subscription, plan, restriction, resource requirement, versioning, or device functionality. For example, the data processing system 102 can grant the computing device 104 access to the application if the computing device 104 is configured with a predefined version of an operating system. In another example, the data processing system 102 can grant the computing device 104 access to the application if the computing device 104 is associated with a valid account or profile. In some cases, if the data processing system 102 determines that the computing device 102 is not authorized to access the application, the data processing system 102 can terminate the thread, prompt the user, or identify another application the computing device 104 is authorized to access. Thus, the data processing system 102 can select the application responsive to the determination that the computing device 104 is authorized to access to the application.

The computer program comprising the application can execute in a secure processing environment on the computing device 104 that is maintained or established by the computing security component 136 of the computing device. In some cases, the application can partially execute on the computing device 104 and partially execute on the data processing system 102. Partial execution can refer to an application that may include a frontend user interface that may perform certain processing and is executed by the computing device 104, while also including a backend component that executes on a server, data processing system 102, or third-party application developer device 108 to perform additional functions. Thus, the data processing system 102 can instruct the computing device to launch the third-party application in the secure processing environment, where the secure processing environment can be initially configured to prevent access to the prior audio input processed by the digital assistant component. Initially being configured to prevent access to the prior audio input can refer to the secure processing environment itself being located in a locked memory that does not have access to a different portion of memory that stores the prior audio input. Initially being configured to prevent access to the prior audio input can refer to the secure processing environment itself not having access rights or privileges to access, request, or retrieve the prior audio input. The secure processing environment, such as a sandbox environment, can be initially configured by a manufacturer of the computing device 104, manufacturer of an operating system executing on the computing device 104, an administrator of the computing device 104, or a user of the computing device 104. However, the data processing system 102 can be configured to pass or forward an indication of the prior audio input as an input upon launching of the application, thereby passing or forwarding the indication of the prior audio input to an application that is executed in a secure processing environment that is not initially configured to access the indication of the prior audio input.

To provide the indication of the prior audio input to the third-party application responsive to determining to invoke a third-party application, the data processing system 102 can determine to generate a packaged data object that includes audio input or an identifier for the packaged data object that includes the audio input. For example, responsive to the remote app launcher 116 determining to invoke, launch, or instantiate, navigate to, open or otherwise utilize an application, the data processing system 102 can determine to obtain, store, indicate, package, or otherwise identify the audio input, queries, responses, conversation or other context that resulted in the invocation of the application, as well the context that led up to the determination to invoke the application. The data processing system 102 can include, interface with or access an audio packaging component 118 designed and constructed to generate, responsive to the determination to invoke the third-party application, a packaged data object comprising prior audio input detected by the microphone prior to reception of the audio input that resulted in invocation of the third-party application. The audio packaging component 118 can be a component of the remote digital assistant 112, or be a separate component or module executed by one or more processors or servers of the data processing system 102.

In some cases, the third party application can be launched or executed in a secure processing environment, or other processing environment or configuration, that precludes or prevents the third-party application from accessing or obtaining information related to the context or conversation that resulted in a digital assistant (e.g., remote digital assistant 112 or local digital assistant component 134) from selecting or launching the third-party application. For example, the third-party application can execute on one or more servers remote from the computing device 104. The third-party application can execute on the data processing system 102. The third-party application can execute on one or more servers remote from the computing device 104 and the data processing system 102, such as servers associated with the third-party application developer device 108. The third-party application can be configured to on a software as a service platform, web-based application, or cloud-based application. The third-party application execute on the one or more servers or data center remote from at least one of the computing device 104 or data processing system 102 can be precluded or prevented from accessing or obtaining information related to the context or conversation that resulted in a digital assistant (e.g., remote digital assistant 112 or local digital assistant component 134) from selecting or launching the third-party application.

To provide this context, the data processing system 102 can provide information about prior audio input or conversation that occurred prior to the determination to launch or invoke the third-party application. The audio packaging component 118 can generate an indication of the prior audio input, such as a packaged data object or a unique identifier corresponding to the prior audio input. For example, the audio packaging component 118 can create a packaged data object that includes a structured conversation, generate a packaged data object that includes a serialized opaque token, generate a packaged data object that includes event identifiers indicating events in the prior audio input, generate a packaged data object that includes event identifiers formed from a query and a response to the query.

The prior audio input can refer to audio input detected by the microphone of the computing device 104 prior to launch of the third-party application. The prior audio input can refer to audio input that was processed by the local digital assistant 134 or remote digital assistant 112. The prior audio input can refer to audio input that a user authorizes or permits the local digital assistant 134 or remote digital assistant 112 to process, parse or otherwise use. The prior audio input can refer to audio input that occurred during a predetermined time interval prior to launching the third-party application. The time interval can be a fixed time interval or a dynamic time interval. For example, the fixed time interval can be 15 seconds, 30 seconds, 45 seconds, 1 minute, 2 minutes, 3 minutes, 4 minutes, 5 minutes, 10 minutes or more. The dynamic time interval can be a time interval that is dynamically set or determined based on one or more factors. Factors can include, for example, time of day, location, type of application, keywords associated with the audio input, frequency of audio input, spoken words per second, number of sentences, vertical, topic or other factor. For example, if the application that is launched relates to clothing or apparel, then the data processing system 102 can set a time interval that is shorter as compared to an application that might be launched to finds a home to purchase.

In some cases, the duration or time interval can be set based on a conversation session. The data processing system 102 can determine or identify a conversation session based on or more characteristics of the audio input. For example, the conversation session can refer to a user carrying a conversation with a digital assistant (e.g., 134 or 112) about a topic. The conversation can refer to one or more topics, but can be a sequence of audio inputs that are related to one another or logically related to one another and progress from one topic to another. The conversation session can refer to audio input that relates to an initial query that initiated the conversation.

For example, the data processing system 102 can determine that the query "I'm bored, what should I do?" is the beginning or initiation of a conversation session. The data processing system 102 can determine that this first input audio signal includes a request to identify entertainment options. The data processing system 102 can respond with a first output signal "Would you like to play a video game?" The second input audio signal can be "Yes, what do you suggest?" The second output audio signal can be "Would you like to play a role playing game, a racing game, or a puzzle game." The third input audio signal can be "I would like to play a puzzle game". The third output audio signal can be "How about a crossword puzzle or Sudoku?" Sudoku can refer to a logic-based, combinatorial number-placement puzzle. The fourth input audio signal can be "Let's play Sudoku." The audio input and responses subsequent to this initial query in and that result in an application being launched can be related to a same conversation. The data processing system 102 can determine that the audio input and responses from the beginning of the conversation session (e.g., first input audio, first output audio, second input audio, second output audio, third input audio, third output audio, fourth input audio and fifth input audio) up until the application is launched provide context surrounding the resulting determination to launch the application. Thus, the data processing system 102 can be configured to identify the input and output responses as prior audio input, and provide an indication of this prior audio input to the third party application upon launch of the third-party application.

The packaged data object can include one or more components corresponding to the prior audio input or conversation. The components in the packaged data object can include, for example, one or more of: 1) the actual serialized conversation in text form; 2) the structured conversation in an object-oriented fashion; or 3) a summary of the conversation.

The packaged data object can include, for example, the actual conversation in a serialized format (e.g., text corresponding to the first input audio, text corresponding to the first output audio, text corresponding to the second input audio, text corresponding to the second output audio, text corresponding to the third input audio, and text corresponding to the third output audio). In some cases, the packaged data object can include text corresponding to the input audio, but exclude text corresponding to the output audio. For example, to reduce bandwidth, data file size, memory, or other processing or computer utilization, the data processing system 102 or local digital assistant 134 can filter out or exclude the output of the digital assistant (e.g., 112 or 134) in the packaged data object such that the packaged data object only includes the first input audio, second input audio, and third input audio (or text thereof).

In some cases, the data processing system 102 can generate the actual conversation component of the packaged data object to include an indication of the sequence or order in which the input audio output audio occurred (e.g., first input, followed by first output, followed by second input, followed by second output, etc.). The data processing system 102 can generate the actual conversation component to include the structure of the text in the conversation, such as punctuation. The data processing system 102 can generate the actual conversation component to include timestamps associated with the input audio and output audio. The data processing system 102 can generate the actual conversation component to include or be based on the structure of the language, such as several words make a phrase, several phrases make a sentence and sentences can convey ideas. The data processing system 102 can generate the actual conversation component without ambiguities, such as one or more of lexical ambiguities (e.g., where words have multiple meanings), syntactic ambiguity (e.g., where sentences have multiple parse trees), semantic ambiguity (e.g., where sentences have multiple meanings), or anaphoric ambiguity (e.g., where a phrase or word that was previously mentioned now has a different meaning). In some cases, to generate the actual conversation component of the packaged data object, the data processing system 102 can convert portions or chunks of the conversation into formal representations, such as a first-order logic structure, that facilitates manipulation by the data processing system 102 or other computer program or component.

The data processing system 102 can generate the structured component of the packaged data object to include aspects of the conversation in a structured format, such as in an object-oriented structure. The structured component of the conversation can include, refer to, or indicate unique identifiers of objects of interest, such as products or services, indicated in the conversation. The object-oriented structure can include, for example, a keyword or unique identifiers corresponding to a product mentioned in the conversation or prior audio input, such as shoes, or ABC 123, which may be a unique alphanumeric identifier that maps to shoes. Thus, and in some cases, the structured component of the conversation or packaged data object can include only desired entities in the conversation, such as a product (e.g., video game or a specific video game) or a service (e.g., ride-sharing service or grocery delivery service). The objects indicated in the structured conversation can include predetermined objects of interest, such as products or services for which the data processing system 102 may be configured to perform further downstream processing. By only including objects in the structured component of the packaged data object on which the data processing system 102 is configured to perform further downstream processing, the data processing system 102 can reduce the file size of the packaged data object, reduce bandwidth associated with transmitting the packaged data object, as well as reduce downstream processing or errors by preventing the data processing system 102 from attempting to parse or process objects that the data processing system 102 is not configured to process.

In some cases, the structured component of the packaged data object can include event identifiers that indicate events in the prior audio input. The event identifiers can be formed from a query and a response to the query. Event identifiers can be established for types of events in the conversation, such as an input query, output response, speech acts (e.g., yes-no question, content question, statement, or assertion), relationships between sentences (e.g., elaboration, explanation, or contrast).

The data processing system 102 can create the packaged data object to include a summary component. The summary component can provide topical or vertical information associated with the conversation, for example. The summary can include keywords or metadata associated with the conversation. The data processing system 102 can generate the summary using semantic analysis techniques or natural language processing techniques. The summary can indicate, for example, a category associated with the launched application, such as entertainment or game. The summary can include or indicate the reason the conversation was initiated, such as a user seeking entertainment. Thus the data processing system 102 can generate the packaged data object to include one or more fields, components or structure that convey the conversation or aspects thereof in one or more formats.

In some cases, the data processing system 102 (e.g., via the local digital assistant 134) can configure or format the packaged data object such that the third-party application cannot parse or process the packaged data object, or otherwise identify or utilize the contents of the packaged data object. For example, the data processing system 102 can generate the packaged data object to include a serialized opaque token, or the packaged data object can be or include a serialized opaque token. A serialized opaque token can refer to a format for passing an indication of the prior audio input to the third-party application such that the third-party application cannot parse the prior audio input, and does not need to be able to parse the prior audio input. For example, the token can be the packaged data object, and serializing the token can refer to a formatting or configuring the token such that multiple threads or applications may be able to access the token. The token can be locked a format in which the token can be written that is multiprocessor-safe code without the need for lower level subsystems being aware of each entity that may also be holding the same token.

The data processing system 102 can provide the prior audio input as an encrypted data object, item or file that cannot be parsed, opened, analyzed or otherwise processed by the third-party application. The data processing system 102 can be configured with an encryption technique and apply the encryption technique to the prior audio input before providing the prior audio input to the local digital assistant 134 to pass, forward or provide to the third-party application. The third-party application may not be configured with the decryption technique or key in order to decrypt the prior audio input. Instead, the third-party application may forward the encrypted prior audio input to an intended endpoint that is authorized, permitted or configured to decrypt and parse the prior audio input.

The packaged data object can be generated by the data processing system 102, the remote digital assistant 112, or the local digital assistant 134. In some cases, the packaged data object can be generated by the local digital assistant 134 interacting with the remote digital assistant 112. In some cases, the packaged data object can be generated by the remote digital assistant 112 interacting with the local digital assistant component 134. The packaged data object can be stored locally on the computing device 104, or remotely in the packaged data data structure 128 of the data repository 124 on the data processing system 102. In some cases, to reduce processing burden on the computing device 104, the data processing system 102 can determine to generate the packaged data object and store the packaged data object in data repository 128.

In some cases, the audio packaging component 118 can store the generated packaged data object in the packaged data data structure 128. The audio packaging component 118 can assign the packaged data object a unique identifier (e.g., a package identifier or package ID or conversation identifier or conversation ID). For example, the data processing system 102 can generate a unique identifier based on a hash function, and assign the unique identifier to the packaged data object. The data processing system 102 can store, in a table, a mapping of the unique identifier to the corresponding packaged data object. Thus, the data processing system can generate, responsive to the determination to invoke the third-party application, a unique identifier corresponding to prior audio input (e.g., the packaged data object) detected by the microphone prior to reception of the audio input that resulted in invocation of the third-party application.

In some cases, the data processing system 102 can assign a unique identifier to the prior audio input, and store the prior audio input in the data repository 124. The data processing system 102 can convert the prior audio input to event identifier, structured conversation, object identifiers, or a packaged data object. The data processing system 102 can assign the unique identifier to the prior audio input, in any format, and store the unique identifier and prior audio input in the data repository 124.

The data processing system 102 can forward the packaged data object or unique identifier to the computing device 104. The data processing system 102 can forward the packaged data object or unique identifier to the third-party application invoked by the digital assistant component to execute in the secure processing environment on the computing device. The data processing system 102 can provide the packaged data object or unique identifier to the third-party application to cause the third-party application to transmit the packaged data object or unique identifier to a digital component selector 120.

In some cases, the local digital assistant 134 can perform one or more functions to facilitate the data transfer in the secure processing environment. For example, the computing device 104 can, via the computing security component 136, manage or establish a secure processing environment in at least a portion of the memory of the computing device 104. The local digital assistant 134 (or local digital assistant component) can be in communication with the remote digital assistant 112 via a communication channel (e.g., network 105 or a secure channel established via a handshaking protocol or credentialing). The local digital assistant 134 can identify the audio input detected by a microphone (e.g., sensor 138) of the computing device 104. The local digital assistant 134 can invoke, based on the audio input, a third-party application on the computing device. In some cases, the local digital assistant 134 can transmit audio input to the data processing system 102, and then receive instructions from the data processing system 102 (e.g., remote app launcher 116) to invoke the third-party application or which third-party application to invoke. The local digital assistant 134 can, responsive to receiving the instructions or command from the data processing system 102, invoke the third party application in the secure processing environment. In some cases, the computing security component 136 can establish, initiate or create the secure processing environment responsive to or subsequent to receiving the indication to invoke the third-party application. The local digital assistant 134 can obtain, responsive to invocation of the third-party application, an indication of prior audio input detected by the microphone prior to reception of the audio input that resulted in the invocation of the third-party application. The local digital assistant 134 can receive the indication of the prior audio input from memory of the computing device 104 or from the data processing system 102. The indication of the prior audio input can include or refer to the packaged data object, a unique identifier corresponding to the packaged data object stored in data repository 124, or a unique identifier corresponding to the prior audio input stored in data repository 124. The local digital assistant 134 can forward the indication of the prior audio input to the third-party application. The local digital assistant 134 can forward the indication of the prior audio input upon launching the third-party application. The third-party application can configured to transmit, responsive to a content request triggered in the third-party application, the indication of the prior audio input to the digital component selector 120 to execute the real-time content selection process based on the indication of the prior audio input.

The third-party application can determine to request content. The third-party application can transmit the content request to a digital component selector 120. The digital component selector 120 can be a part of the data processing system 102, or separate from the data processing system 102. The third-party application can include the packaged data object or unique identifier along with the content request. The digital component selector 120 can receive the content request and the packaged data object or unique identifier. If the digital component selector 120 receives the unique identifier, the digital component selector 120 can retrieve or request, from the data repository 124, the packaged data object (or prior audio input) corresponding to the unique identifier. The data processing system 102 can identify, using the unique identifier received from the third-party application, the prior audio input or packaged data object. The data processing system 102 can provide, to the digital component selector 120, the prior audio input (or packaged data object) as input for a real-time content selection process. The digital component selector 120 can use the packaged data object to execute a real-time digital component selection process based on the packaged data object. The digital component selector 120 can select a digital component based on the packaged data object.

In some cases, the unique identifier can map to a keyword or topic related to the conversation, rather than the actual conversation. For example, the packaged data object can include one or more keywords or semantic topics related to the conversation. Rather than store or provide the actual conversation or structured conversation, the data processing system 102 can create a packaged data object that includes semantic topics, concepts or one or more keywords. The data processing system 102 can assign this packaged data object the unique identifier, and pass the unique identifier to the local digital assistant. The data processing system 102 can also provide this packaged data object to the digital selector component 120 for digital component selection.

The real-time digital component selection process can refer to, or include, selecting digital component objects (which may include sponsored digital component objects) provided by third party content providers 106. The real-time content selection process can include a service in which digital components provided by multiple content providers are parsed, processed, weighted, or matched based on the packaged data object in order to select one or more digital components to provide to the computing device 104. The digital component selector 120 can perform the content selection process in real-time. Performing the content selection process in real-time can refer to performing the content selection process responsive to the request for content received via the client computing device 104. The real-time content selection process can be performed (e.g., initiated or completed) within a time interval of receiving the request (e.g., 5 seconds, 10 seconds, 20 seconds, 30 seconds, 1 minute, 2 minutes, 3 minutes, 5 minutes, 10 minutes, or 20 minutes). The real-time content selection process can be performed during a communication session with the client computing device 104, or within a time interval after the communication session is terminated.

For example, the digital component selector 120 can be designed, constructed, configured or operational to select digital component objects based on the packaged data object. The digital component selector 120 can identify, analyze, or recognize voice, audio, terms, characters, text, symbols, or images of the candidate digital components using an image processing technique, character recognition technique, natural language processing technique, or database lookup. The candidate digital components can include metadata indicative of the subject matter of the candidate digital components, in which case digital component selector 120 can process the metadata to determine whether the subject matter of the candidate digital component corresponds to the packaged data object.

Digital component provider device 106 can provide additional indicators when setting up a content campaign that includes digital components. The digital component provider device 106 can provide information at the content campaign or content group level that the digital component selector 120 can identify by performing a lookup using information about the candidate digital component. For example, the candidate digital component may include a unique identifier, which may map to a content group, content campaign, or content provider. The digital component selector 120 can determine, based on information stored in content campaign data structure in data repository 124, information about the digital component provider device 106.

The data processing system 102 can receive a request for content for provision via a computing device 104. The request can include selection criteria of the request, such as the packaged data object, device type, or location.

Responsive to the request, the data processing system 102 can select a digital component object from data repository 124 (e.g., content data 132) or a database associated with the digital component provider device 106, and provide the digital component for presentation via the computing device 104 via network 105. The digital component object can be provided by a digital component provider device 106 different from the third-party application developer device 108. The computing device 104 can interact with the digital component object. The computing device 104 can receive an audio response to the digital component. The computing device 104 can receive an indication to select a hyperlink or other button associated with the digital component object that causes or allows the computing device 104 to identify digital component provider device 106, request a service from the digital component provider device 106, instruct the digital component provider device 106 to perform a service, transmit information to the digital component provider device 106, or otherwise identify a good or service associated with digital component provider device 106.

The digital component selector 120 can select a digital component that includes text, string, or characters that can be processed by a text to speech system or presentable via a display. The digital component selector 120 can select a digital component that is in a parameterized format configured for a parametrically driven text to speech technique. In some cases, the dialog data structure can be in SSML format or be configured with voice parameters. The data processing system 102 can configure the voice parameters of the digital component to match the voice parameters of the application that requested the digital component such that the digital component can be presented to the user of the computing device 104 with a native voice, image, or acoustic fingerprint (e.g., the digital component has the same or similar acoustic properties as compared to the dialog data structure without the digital component). The digital component selector 120 can select a digital component that is in a format configured for display via a display device 132. The digital component selector 120 can select a digital component that can be re-formatted to match a native output format of the application.

The digital component selector 120 can select multiple digital components via the real-time content selection process. The digital component selector 120 can score and rank the digital components, and provide multiple digital components to the output merger component 120 to allow the output merger component 120 to select the highest ranking digital component.

The digital component selector 120 can provide the selected digital component to the computing device 104 or local digital assistant 134 or application executing on the computing device 104 for presentation. Thus, the digital component selector 120 can receive the packaged data object and the content request from the third-party application, select, responsive to the content request and via the real-time content selection process, a digital component based on the packaged data object, and transmit, to the computing device, the digital component for presentation via the third-party application executed in the secure processing environment on the computing device. In some cases, the digital component selector 120 can transmit, to the local digital assistant 134, the selected digital component for presentation by the local digital assistant 134 itself, rather than the third-party application executed in the secure processing environment on the computing device. For example, the local digital assistant 134 can play or output an audio signal corresponding to the selected digital component.

The data processing system 102 can identify an interaction with the selected and presented digital component object, and attribute the interaction to the digital assistant that facilitated generated or providing the packaged data object that was used by the digital component selector 120 to select the digital component object. For example, the data processing system 102 can include, interface with or otherwise access an attribution component 122 designed and constructed to receive an indication of an interaction with the selected digital component presented via the computing device, and attribute the interaction to the digital assistant component 112 or local digital assistant 134.

In some cases, the local digital assistant 134 can be a different type of digital assistant than the remote digital assistant 112. The local digital assistant 134 can be provided by an entity or third-party that is different from the entity or administrator of the data processing system 102, remote digital assistant 112, or digital component selector 120. The digital assistant can be associated with a version or configuration. Thus, the attribution component 122 can attribute the interaction to the digital assistant associated with the conversation corresponding to the packaged data object used to select the digital component.

To perform the attribution, and in some cases, the audio packaging component 118 can include, in the packaged data object, an identifier of the digital assistant that participated in the conversation that led to the prior audio input that resulted in the launching of the third-party application. The data processing system 102 can include a table of digital assistant identifiers. The digital component selector 120 can maintain the identifier when selecting the digital component object and pass the identifier along with the selected digital component object. When an interaction occurs with the digital component object, the digital component object can transmit an indication of the interaction to the data processing system 102 or other entity along with the identifier of the digital assistant component associated with the conversation. Thus, the data processing system 102 can attribute the interaction with the digital component to the identified digital assistant.

In some cases, the audio packaging component 118 can query the attribution component 122 to obtain an identifier for the digital assistant component. The audio packaging component 118 can query the attribution component 122 prior to or during the generation of the packaged data object. The audio packaging component 118 can request, from the attribution component 122, an identifier to include in the packaged data object that can facilitate attributing the packaged data object to an interaction with a digital component selected based on the packaged data object. The identifier can be or include a hash value based on a hash function whose inputs can include, for example, one or more of a time stamp, conversation duration, device identifier, or digital assistant identifier. The attribution component 122 can form an n-tuple, generate a hash value based on the n-tuple, and store, in a hash table, a mapping of the hash value to the digital assistant identifier or other information used to generate the hash value.

For example, the audio packaging component 118 can provide, to the attribution component 122, a name or type of the digital assistant that participated in the conversation along, a device identifier, and a date and time stamp. The attribution component 122 can generate a unique identifier based on a hash value generated from the name of the digital assistant and the timestamp. The attribution component 122 can store, in a hash table maintained in the data repository 124, a mapping of the hash value to the timestamp and the name of the digital assistant. The attribution component 122 can provide, responsive to the query from the audio packaging component 118, the unique indicator or hash value for inclusion in the packaged data object. The third-party application can receive the packaged data object (e.g., as a serialized opaque token) and provide it to the digital component selector 120 along with a content request. The digital component selector 120 may identify the hash value in the packaged data object, and then embed the hash value in the selected digital component object. The digital component object can be presented via the computing device 104. An interaction with the digital component object can cause an indication of the interaction to be passed to the data processing system 102 along with the hash value. The data processing system 102 can perform a lookup in a hash table using the hash value to identify the digital assistant, device identifier, or date and time stamp corresponding to the hash value. The data processing system 102 can attribute the interaction to the identified digital assistant.

In some cases, the attribution component 122 can tune, modify, or weight the selection protocol or process used by the digital component selector 120 to select digital component. The attribution component 122 can provide a feedback loop that facilitates tuning the digital component selector 120 to improve selection. For example, the attribution component 122 can increase the weight of attributes in the packaged data object or prior audio input if a digital component selected based on the packaged data object results in an interaction or desired interaction with the digital component object. In another example, the attribution component 122 can increase the weight of attributes based on the type of digital assistant device that facilitated the conversation used to generate the packaged data object. In some cases, the digital component selector 120 can tune the selection process by adjusting weights based on feedback from the attribution component 122. The digital component selector 120 or attribution component 122 can use the feedback information as input to a machine learning algorithm or to train a machine learning algorithm to improve performance of the selection process. Improving the selection process using feedback and the packaged data object can result in more efficient content selection by reducing the number of digital components that are transmitted to a computing device before receiving a desired interaction.

Figure 2:
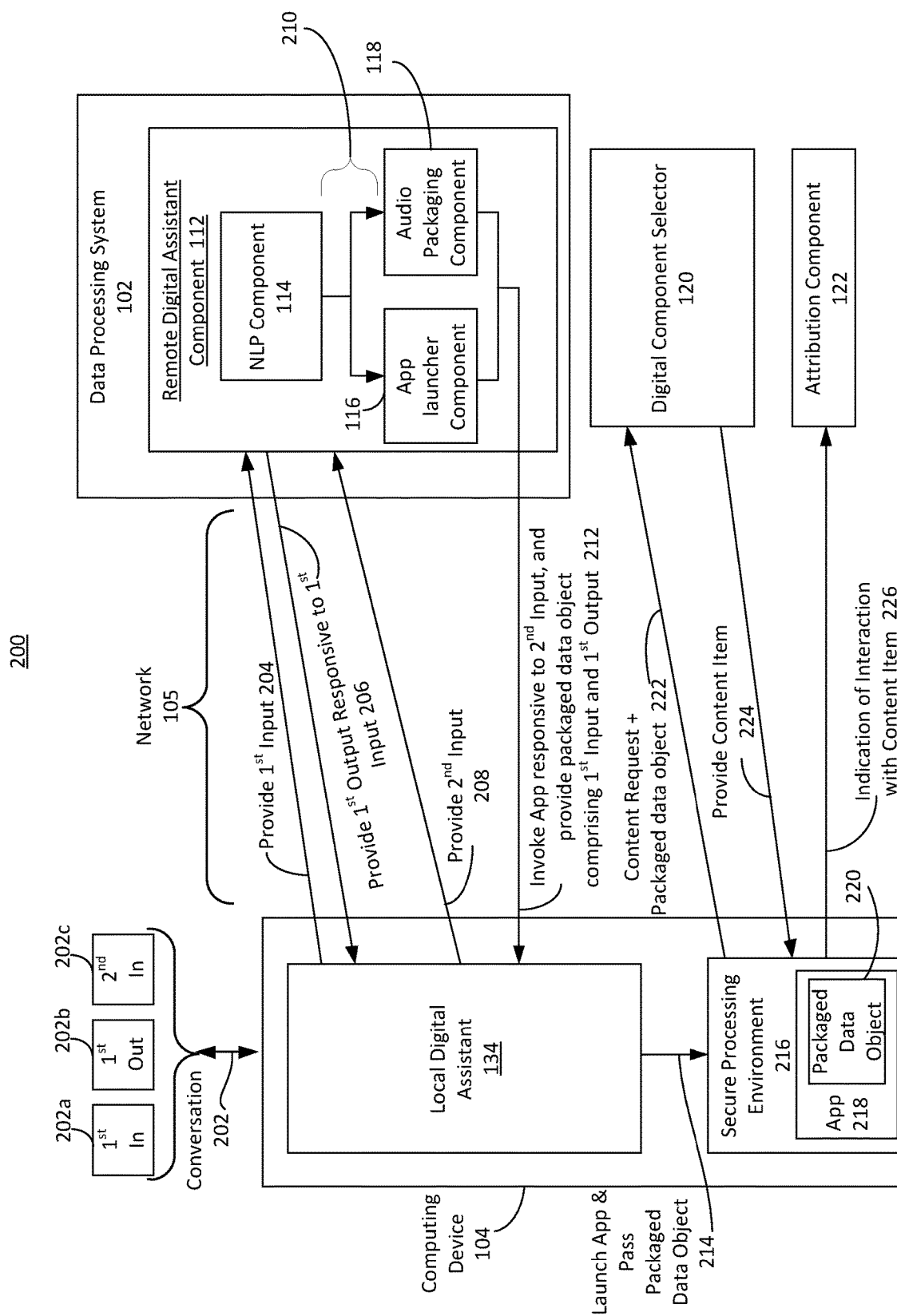
FIG. 2 is an illustration of an operation of a system to transfer data in a secure processing environment, in accordance with an example.

FIG. 2 is an illustration of an operation of a system 200 to transfer data in a secure processing environment. The operation of system 200 can include one or more component or functionality of system 100 depicted in FIG. 1. For example, the operation of system 200 can be performed by or with a data processing system 102, computing device 104, third-party application developer device 108, or digital component provider device 106. At ACT 202, the computing device 104 can facilitate a conversation. ACT 202 can refer to a conversation that includes one or more of 202a, 202b, or 202c. The conversation can include input audio and output audio. The input audio can include one or more portions, and the output audio can include one or more portions. For example, the conversation can begin with a $1^{st}$ input 202a. The $1^{st}$ input 202a can include speech input from a user of the computing device 104. In an illustrative example, the $1^{st}$ input 202a can be "I need to buy new clothes to attend a wedding." The local digital assistant 134 can pre-process or parse the $1^{st}$ input 202a. The local digital assistant 134 can convert the $1^{st}$ input 202a into text or an audio data file.

At Act 204, the local digital assistant 134 can transmit, via network 105, the converted or formatted $1^{st}$ input 202a to a remote digital assistant 112 executed by a data processing system 102. The remote digital assistant 112 can include an NLP component 114 that can process the $1^{st}$ input and generate a response. The response to the $1^{st}$ input can be referred to as a $1^{st}$ output 202b. In an illustrative example, the $1^{st}$ output 202b can be "Would you like to launch an app for Clothing Retailer A or Clothing Retailer B to find new clothes?" The remote digital assistant 112 can interact with the app launcher component 116 to identify the application to suggest based on the $1^{st}$ input 202a. The app launcher component 116 can determine suggest the apps based on what apps are installed on the computing device 104, what apps are available for installation on the computing device 104, or what apps are available for execution via computing device 104 with or without installation. At ACT 206, the data processing system 102 can provide the $1^{st}$ output responsive to the $1^{st}$ input to the local digital assistant 134 via network 105. The local digital assistant 134 can provide, via computing device 104, the $1^{st}$ output 202b received from the data processing system 102. The $1^{st}$ input 202a and $1^{st}$ output 202b can be part of the conversation.

The user can respond to the $1^{st}$ output by providing a $2^{nd}$ input 202c. The $2^{nd}$ input 202c can be speech input. The $2^{nd}$ input 202c can be responsive to the $1^{st}$ output 202b. The $2^{nd}$ input 202c can be a selection of one of the applications suggested by the remote digital assistant 112 in the $1^{st}$ output 202b. For example, the $2^{nd}$ input 202c can be "Yes, let's try Clothing Retailer A." At ACT 208, the local digital assistant 134 can provide the $2^{nd}$ input to the remote digital assistant 112.

The remote digital assistant 112 receives the $2^{nd}$ input 202c, which includes an indication to launch an application. Act 210, responsive to receiving the $2^{nd}$ input 202c, the remote digital assistant 112 can invoke the selected application and provide an indication of the prior audio input. For example, responsive to receiving the $2^{nd}$ input 202c, the remote digital assistant 112 can generate a command or instruction to invoke the selected clothing application. The remote digital assistant 112, utilizing the app launcher component 116, can identify a pointer, address or deep-link to the selected application, and generate one or more data packets comprising a command, instruction, or link to launch the application. The app launcher component 116 can provide a command, instruction, or link to download and install the application. The app launcher component 116 can launch the application in a webview or software as a service configuration.

At ACT 210, responsive to receiving the $2^{nd}$ input 202c, the remote digital assistant 112 can generate an indication of the prior audio input that resulted in launching the application. The prior audio input includes input audio prior to the $2^{nd}$ input 202c. The prior audio input may include more context than just the input audio that directly instructed the data processing system 102 to launch the selected application. The prior audio input can include the Pt input 202a. The prior audio input can include the Pt output 202b. The prior audio input can include the Pt input 202a and the Pt output 202b. The prior audio input can include some or all of the input or output text, audio or other communication information that occurred during the conversation. The conversation can refer to or include a communication session that can be identified, by the local digital assistant 134 or remote digital assistant 112, based on a temporal window, topic, logical flow, location, etc.

Responsive to receiving the $2^{nd}$ input 202c, the remote digital assistant 112 can generate an indication of the prior audio input as a packaged data object. The packaged data object can include one or more components. The audio packaging component 118 can generate the packaged data object to include one or more of the Pt input 202a, Pt output 202b, or $2^{nd}$ input 202c.

At ACT 212, the remote digital assistant 112 can transmit one or more data packets, commands, or instructions to the local digital assistant 134 via network 105. The remote digital assistant 112 can transmit a command to invoke the selected application, and also provide the indication of the prior audio input. For example, the remote digital assistant 112 can provide the packaged data object comprising some or all of the conversation. At ACT 214, the data packets transmitted at ACT 212 can cause the computing device to launch the application in a secure processing environment. Responsive to receiving the data packets at ACT 212, local digital assistant 134 can cause the computing device 104 to launch the application in the secure processing environment at ACT 214. Further, at ACT 214, the local digital assistant 134 can input the packaged data object received from the remote digital assistant 112 into the application being launched on the computing device 104. Thus, ACT 214 can include launching the application and inputting the prior audio input (or other context information) received from the data processing system 102.

The application (or app 218) can be launched in a secure processing environment 216 of the computing device 102. The local digital assistant 134 can pass the packaged data object to the app 218 such that the app has access to or stores the packaged data object 220 during execution of the app 218 in the secure processing environment.

For example, the application can be configured with a software development kit ("SDK") that allows for the input of the prior audio input in a format, such as a packaged data object, token, serialized token, serialized opaque token, or unique identifier. In some cases, the SDK of the application is configured to process the prior audio input, and in some cases the SDK is configured to receive the prior audio input without being able to process the prior audio input, but able to transmit the prior audio input to a digital component selector 120. The application launched in the secure processing environment may not have access to, or be prohibited from accessing, information or data stored outside the secure processing environment. Thus, and in some cases, the application receives or obtains the prior audio input as a result of the SDK configured in such a way as to receive the prior audio input from the local digital assistant 134 or other component. In some cases, the local digital assistant 134 can store the prior audio input in the secure processing environment or other portion in memory that has been unlocked or authorized for access by the application.

At ACT 222, the application executing on the computing device 104 can trigger a content request or request for a digital component. For example, a tag or script running in the application can trigger the request for content responsive to an event or condition. The application can generate the request for content to include the prior audio input received from the data processing system 102 at ACT 212. The application, via computing device 104, can transmit the content request along with the packaged data object to the digital component selector 120. The digital component selector 120 can be part of the data processing system 102, or part of a separate server or entity. The digital component selector 120 can be separate from the remote digital assistant 112 or data processing system 102. The digital component selector 120 can be maintained or administered by a separate entity. Since the digital component selector 120 can receive the packaged data object containing the conversation, the digital component selector 120 can perform a selection process based on the conversation even though the digital component selector 120 is separate from the computing devices or entities that participated in the conversation.

The digital component selector 102 can receive the request and the prior audio input, and use the prior audio input to select a digital component responsive to the request and based on the prior audio input. The digital component selector 120 can perform a real-time content selection process. The real-time content selection process can use information associated with the content request (e.g., keywords, device identifier, location information) as well as information associated with the prior audio input (e.g., $1^{st}$ input 202a, $1^{st}$ output 202b, or $2^{nd}$ input 202c). For example, the digital component selector 120 can generate one or more keywords from the Pt input 202a "I need to buy new clothes to attend a wedding" to input into a real-time content selection process. Keywords can include "clothes" and "wedding". Keywords can include "attend" or "buy" or "new". The digital component selector 120, based on these keywords and the content request, can select a digital component related to "wedding", such as travel, hotel, flights, gifts, or cards. The digital component selector 120 can provide the selected content item at ACT 224.

At ACT 226, the attribution component 122 can receive an indication of interaction with the content item. The indication of interaction can include an interaction with the digital component via an input device of the computing device 104, such as an audio input, speech input, mouse, touchscreen, gesture, or keyboard. The indication of interaction can include, for example, that the content item was presented, played via audio output, presented for display, selected, mouse rollover, paused, resulted in a conversion, or other interaction.

Figure 3:
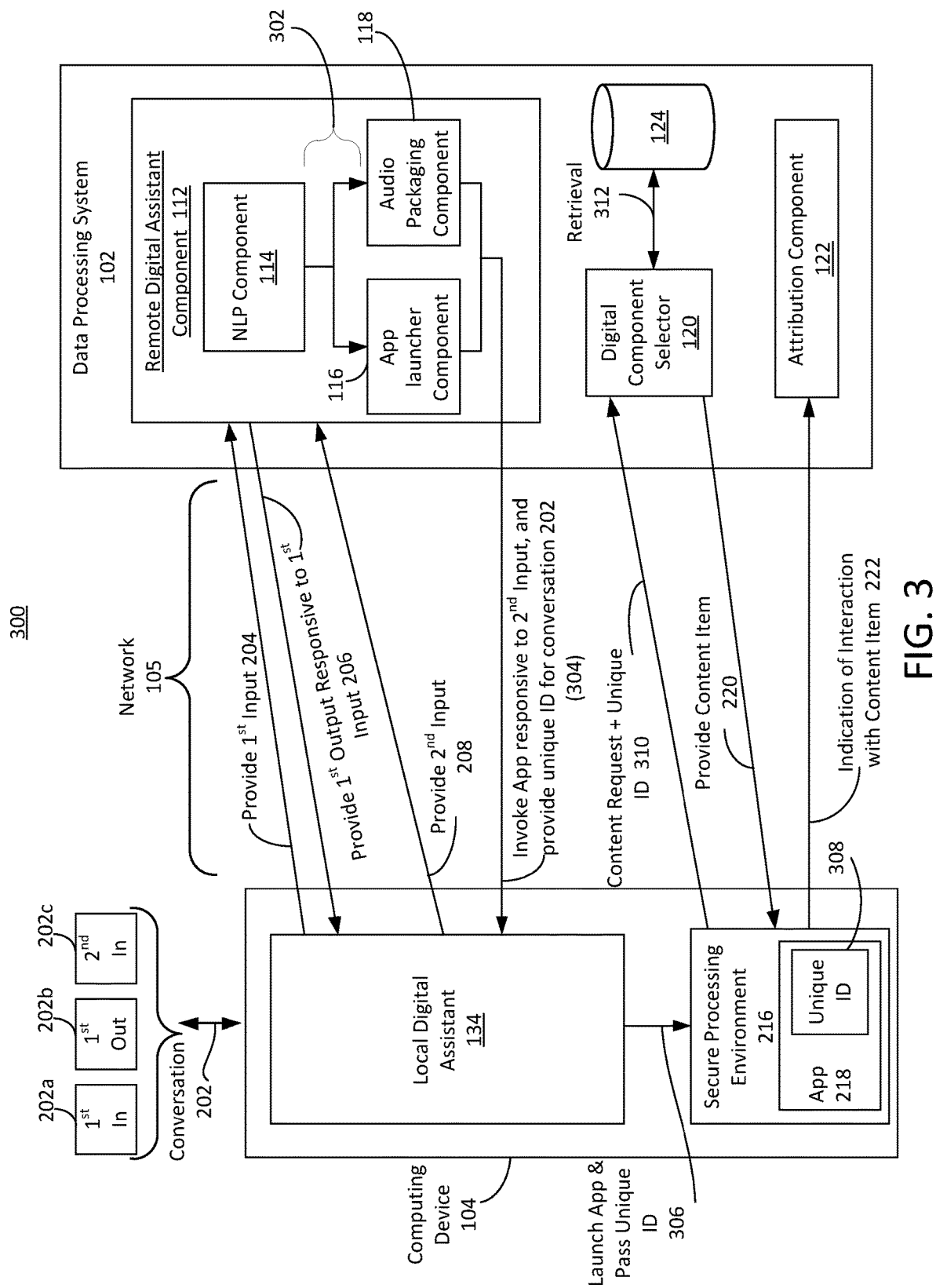
FIG. 3 is an illustration of an operation of a system to transfer data in a secure processing environment, in accordance with an example.

FIG. 3 is an illustration of an operation of a system 300 to transfer data in a secure processing environment. The operation of system 300 can include one or more component or functionality of system 100 depicted in FIG. 1. For example, the operation of system 200 can be performed by or with a data processing system 102, computing device 104, third-party application developer device 108, or digital component provider device 106. The operation of system 300 can include one or more operation or step depicted in the operational diagram 200 of FIG. 2. For example, ACTS 202, 204, 206 and 208 depicted in FIG. 3 can be similar to the corresponding ACTS 202, 204, 206 and 208 depicted in FIG. 2. The system 300 can include a data processing system 102 that includes the digital component selector 120. The digital component selector 120 can have access to the data repository 124.

At ACT 302, responsive to receiving the $2^{nd}$ input 208 from the local digital assistant 134, the remote digital assistant 112 can instruct the app launcher 116 to provide instructions to launch the selected application, and instruct the audio packaging component 118 to generate a unique identifier corresponding to the conversation. Rather than provide the packaged data object containing the conversation, as depicted in FIG. 2, the remote digital assistant 112 can generate a unique identifier that corresponds to the conversation or packaged data object. The remote digital assistant 112 can store the conversation or packaged data object in the data repository 124, and assign the unique identifier to the stored conversation or packaged data object to facilitate downstream processing.

At ACT 304, the remote digital assistant 112 can transmit data packets instructions to the local digital assistant 134 to invoke the application. The remote digital assistant 112 can also transmit or provide the unique identifier ("ID") for the conversation to the local digital assistant 134. At ACT 306, the local digital assistant 134 can launch the application in the secure processing environment 216 and pass, to the application, the unique identifier 308. The application (or app 218) can execute in the secure processing environment 216 and have access to, or store, the unique ID 308. The unique ID 308 can correspond to the conversation, or packaged data object, stored in the data repository 124. Passing the unique ID to the to the local digital assistant 134 instead of the packaged data object can reduce bandwidth utilization over network 105 as compared to passing the packaged data object 220 over the network 105 as depicted in FIG. 2.

At ACT 310, the app 218 can provide a content request with the unique ID to the digital component selector 120. The unique ID, or token, can be pre-existing. For example, the unique ID can be assigned to a packaged data object that already exists in the data repository 124. The content request can be triggered responsive to an event, condition, tag, or script in the app 218. Since the unique ID does not itself contain the packaged data object or conversation, the digital component selector 120, at ACT 312, can retrieve the conversation or packaged data object from data repository 124. For example, the digital component selector 120 can perform a lookup in the data repository 124 using the unique ID. The digital component selector 120 can query the data repository 124 using the unique ID. The digital component selector 120 can query the remote digital assistant 112, which can, in turn, query the data repository 124 for the packaged data object or conversation.

In some cases, the digital component selector 120 can be part of, or associated with, the data processing system 102. The digital component selector 120 can use the conversation or packaged data object to perform a content selection process and select a digital component. At ACT 220, the digital component selector 120 can provide the selected digital component or content item to the app 218 executing in the secure processing environment 216. At ACT 222, the attribution component 122 receives an indication of the interaction with the content item, and attributes the interaction to the digital assistant 134 or remote digital assistant 112, or both, that facilitated the conversation used to the select the digital component or content item.

Figure 4:
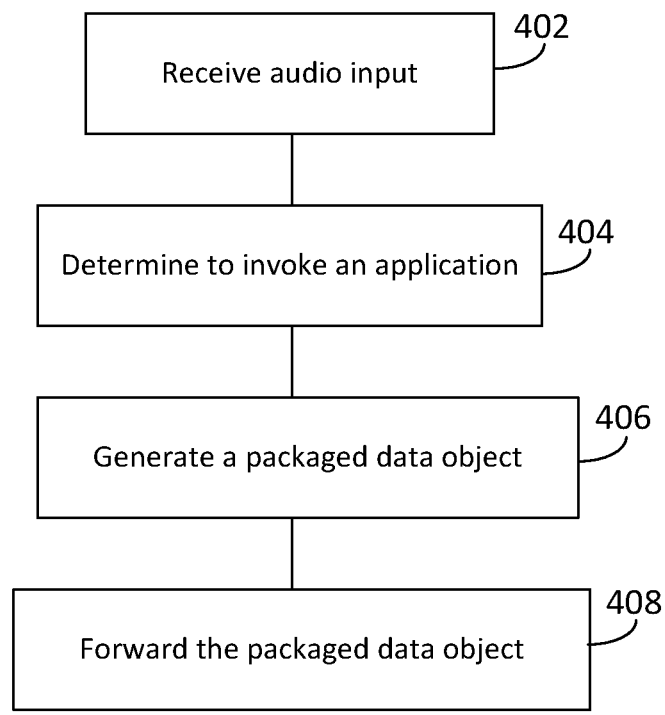
FIG. 4 is an illustration of a method of transferring data in a secure processing environment, in accordance with an example.

FIG. 4 is an illustration of a method of transferring data in a secure processing environment. The method 400 can be performed by one or more component or system depicted in FIG. 1, FIG. 2 or FIG. 9. The method 400 can include a data processing system receiving audio input at ACT 402. The data processing system can receive audio input detected by a microphone of a computing device. For example, a digital assistant component executed at least partially by a data processing system comprising one or more processors and memory can receive the audio input. The audio input can include a conversation facilitated by a digital assistant. The conversation can include one or more inputs and outputs. The conversation can be audio based, text based, or a combination of audio and text. The audio input can include text input, or other types of input that can provide conversational information. The data processing system can receive the audio input for a session corresponding to the conversation. The data processing system can receive the audio input in one or more portions or as a bulk or batch upload (e.g., multiple portions of the conversations uploaded in a single transmission to reduce the number of transmissions).

At ACT 404, the data processing system can determine to invoke an application. The data processing system can determine to invoke a third-party application based on the audio input. The data processing system can select the application based on the audio input. Third-party application can refer to an application that was developed by an entity that is different from the entity that administers the data processing system. Third-party can refer to any entity different from the entity administering, managing, or otherwise maintaining the data processing system. In some cases, the data processing system can identify, via a lookup in a database, a deep-link for the third-party application. The data processing system can use the deep-link to invoke the third-party application.

At ACT 406, the data processing system can generate a packaged data object. The data processing system can generate, responsive to the determination to invoke the third-party application, a packaged data object. The packaged data object can include prior audio input detected by a microphone of a computing device prior to reception of the audio input that resulted in invocation of the third-party application. For example, the prior audio input can include some or all of a conversation facilitated by a digital assistant. The conversation facilitated by the digital assistant may have resulted in the determination to launch the selected third-party application. The data processing system can generate the packaged data object with one or more components. The packaged data object can include one or more components, structures, fields, or objects. For example, the packaged data object can include the actual conversation, an object-oriented format for the conversation, structured conversation, keywords, the structured conversation, or event identifiers.

At ACT 408, the data processing system can forward the packaged data object. The data processing system can forward the packaged data object to the third-party application. The data processing system can forward the packaged data object to the third-party application via the digital assistant component (e.g., local digital assistant executing on the computing device that executes the third-party application or a remote digital assistant). The data processing system can forward the packaged data object to the third-party application via the digital assistant that facilitated the conversation. The third-party application can be configured to transmit, responsive to a content request triggered in the third-party application, the packaged data object to a digital component selector. The digital component selector can select a digital component based on the content request and the packaged data object. The digital component selector can provide the selected digital component for presentation via the computing device. The computing device can present the selected digital component via a local digital assistant or the third-party application. The computing device can presented the selected digital component using audio output, text output, image output, video output, or other output technique.

In some cases, an interaction with the selected digital component can be attributed to the digital assistant that facilitated the conversation that formed the packaged data object used to facilitate selection of the digital component object. Attributing the interaction to the digital assistant can improve the performance of the digital assistant, digital component selector, or data processing system by allowing the components to tune, weight or train selection processes, algorithms, or natural language processing based on the feedback.

Figure 5:
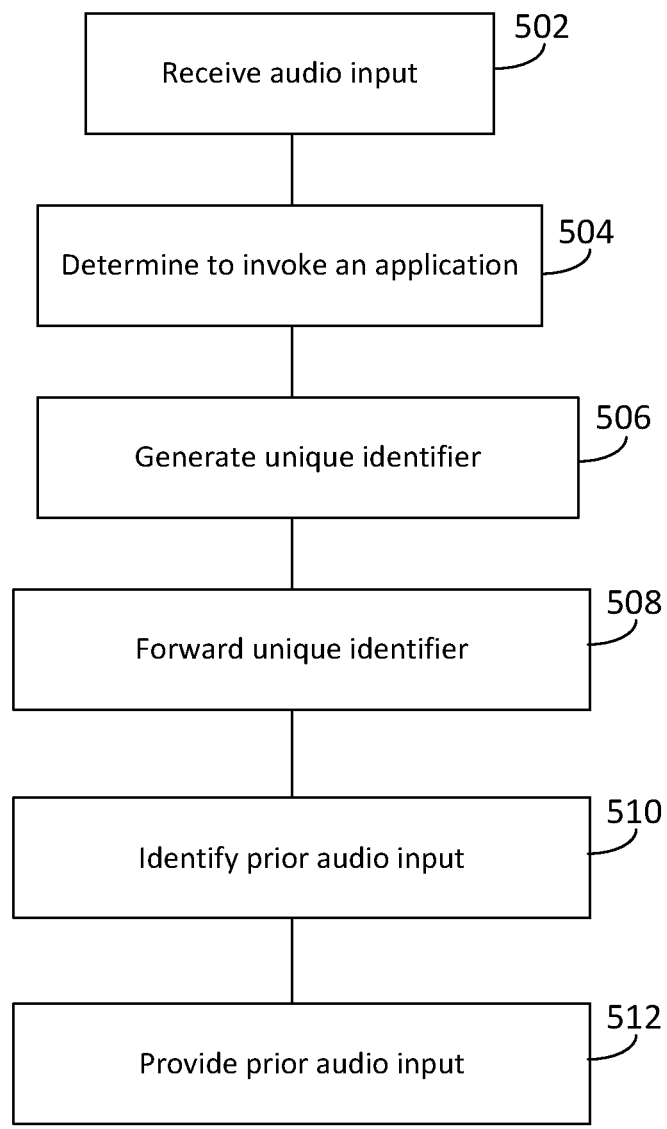
FIG. 5 is an illustration of a method of transferring data in a secure processing environment, in accordance with an example.

FIG. 5 is an illustration of a method of transferring data in a secure processing environment. The method 500 can be performed by one or more component or system depicted in FIG. 1, FIG. 3 or FIG. 9. The method 500 can include a data processing system receiving audio input at ACT 502. The data processing system can receive audio input detected by a microphone of a computing device. For example, a digital assistant component executed at least partially by a data processing system comprising one or more processors and memory can receive the audio input. The audio input can include a conversation facilitated by a digital assistant. The conversation can include one or more inputs and outputs. The conversation can be audio based, text based, or a combination of audio and text. The audio input can include text input, or other types of input that can provide conversational information. The data processing system can receive the audio input for a session corresponding to the conversation. The data processing system can receive the audio input in one or more portions or as a bulk or batch upload (e.g., multiple portions of the conversations uploaded in a single transmission to reduce the number of transmissions).

At ACT 504, the data processing system can determine to invoke an application. The data processing system can determine to invoke a third-party application based on the audio input. The data processing system can select the application based on the audio input. Third-party application can refer to an application that was developed by an entity that is different from the entity that administers the data processing system. Third-party can refer to any entity different from the entity administering, managing, or otherwise maintaining the data processing system. In some cases, the data processing system can identify, via a lookup in a database, a deep-link for the third-party application. The data processing system can use the deep-link to invoke the third-party application.

At ACT 506, the data processing system can generate a unique identifier. The unique identifier can be assigned to the prior audio input or conversation facilitated by the digital assistant that resulted in the application being invoked or launched. The data processing system can generate the unique identifier responsive to determining to invoke the third-party application. The data processing system can store the prior audio input in one or more formats on the data processing system or a data repository, and assigned the prior audio input the unique identifier. In some cases, the digital assistant component or data processing system can generate event identifiers for the prior audio input, and map in a lookup table stored on the data processing system, the event identifiers for the prior audio input to the unique identifier.

At ACT 508, the data processing system can forward the unique identifier to the computing device. The data processing system can forward the unique identifier to the third-party application invoked or launched by the digital assistant. The data processing system can forward the unique identifier to the digital assistant. The digital assistant can pass the unique identifier to the third-party application. For example, the data processing system can forward the unique identifier to the local digital assistant executing on the computing device, and the local digital assistant can pass the unique identifier to the third-party application that is being launched or executing in the secure processing environment. The third-party application can transmit, responsive to a content request triggered in the third-party application, the unique identifier to the data processing system. The third-party application can transmit the unique identifier along with the content request.

At ACT 510, the data processing system can identify the prior audio input. The data processing system can use the unique identifier to retrieve, obtain, or otherwise identify the prior audio input. The data processing system can perform a lookup in a data base or data repository to retrieve the prior audio input. The prior audio input can be in the form of a packaged data object or text conversation.

At ACT 512, the data processing system can provide the prior audio input to a digital component selector. The digital component selector can use the prior audio input to select a digital component. The digital component selector can select the digital component based on the content request and the prior audio input.

The data processing system can provide, to the digital component selector, the unique identifier and the content request received from the computing device. The digital component selector can to select, responsive to the content request and via the real-time content selection process, a digital component based on the prior audio input corresponding to the unique identifier. The digital component selector can transmit, to the computing device, the digital component for presentation via the third-party application executed in the secure processing environment on the computing device.

The data processing system can transmit, for presentation via the computing device, a digital component selected based on the prior audio input. The data processing system can receive an indication of an interaction with the digital component presented via the computing device. The data processing system can attribute the interaction with the digital component to the digital assistant component.

Figure 6:
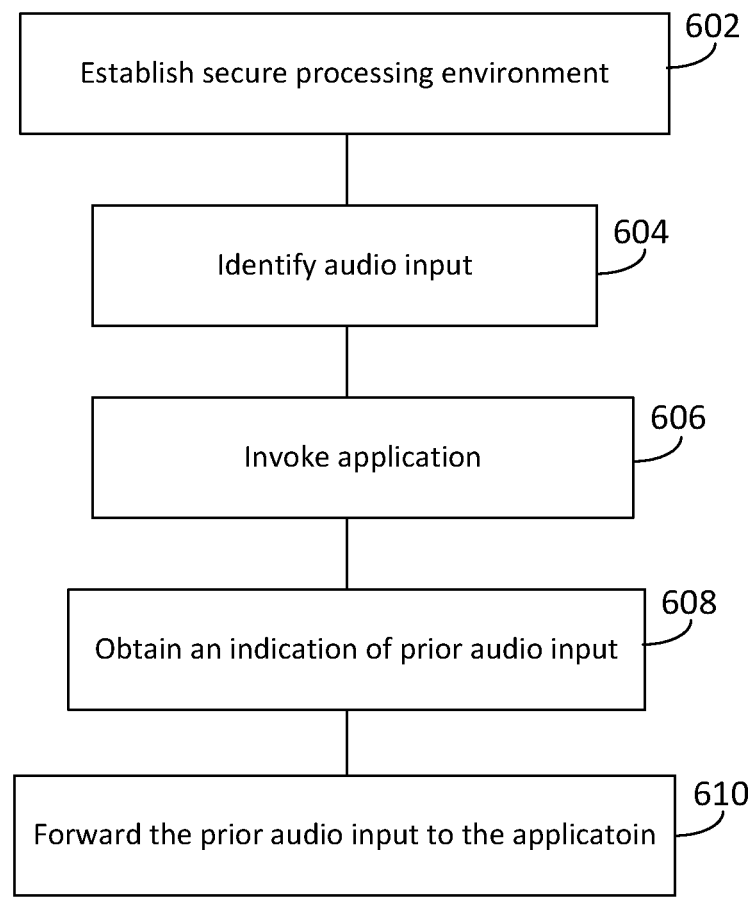
FIG. 6 is an illustration of a method of transferring data in a secure processing environment, in accordance with an example.

FIG. 6 is an illustration of a method of transferring data in a secure processing environment. The method 600 can be performed by one or more component or system depicted in FIG. 1, FIG. 2, FIG. 3 or FIG. 9. The method 600 can include a computing device establishing a secure processing environment at ACT 602. The computing device can establish the secure processing environment in at least a portion of the memory of the computing device. In some cases, establishing the secure processing environment can refer to identifying, obtaining, accessing or providing configuration settings that are designed or constructed to restrict access. For example, an application can be restricted from accessing one or more functions or data on the computing device. By restricting what the application can access, the computing device can protect other components or data stored or executed on the computing device.

At ACT 604, a local digital assistant executed by the computing device can identify audio input detected by a microphone of the computing device. The audio input can include one or more portions of a conversation. The audio input can include words, phrases, sounds, keywords, events or other information associated with a conversation. The conversation can include a command, query, instruction, or request. The audio input can include dialog. The audio input can include speech input. The audio input can refer to a two-way conversation between a user of the computing device and a digital assistant. The digital assistant can be the local digital assistant. The digital assistant can include a remote digital assistant executed or maintained on a server or data processing system. The local digital assistant can be in communication with the remote digital assistant in order to facilitate or conduct the conversation.

At ACT 606, the local digital assistant can invoke an application. The local digital assistant can invoke the application based on the audio input. The local digital assistant can receive instructions from the remote digital assistant to invoke the application, which can be based on the audio input. The local digital assistant component can invoke the application (e.g., third-party application) responsive to the command or instruction from the data processing system. Invoking the application can include or refer to opening the application or launching the application or executing the application. The local digital assistant can invoke the third-party application in the secure processing environment such that the third-party application is restricted from accessing or using certain functions or data of or on the computing device.

At ACT 608, the local digital assistant can obtain an indication of the prior audio input. The local digital assistant can obtain the indication of the prior audio input responsive to invocation of the third-party application. The indication of prior audio input can refer to the conversation or audio input detected by the microphone prior to reception of the audio input that resulted in invocation of the third-party application. For example, the identified audio input can include a first portion and a second portion. The first portion can be prior to the second portion. The second portion of the audio input can include the command or request from the user to launch the application, whereas the first portion can include audio input prior to the command to launch the application.

The indication of the prior audio input can include a packaged data object that includes the prior audio input detected by the microphone prior to the reception of the audio input that resulted in the invocation of the third-party application. The indication of the prior audio input can include a unique identifier that maps to the conversation or packaged data object stored in a data repository on the data processing system.

In some cases, the local digital assistant component can generate, responsive to the invocation of the third-party application, the packaged data object that includes the prior audio input detected by the microphone prior to the reception of the audio input that resulted in the invocation of the third-party application. The local digital assistant can include or be configured with one or more functions or components of the data processing system to generate the packaged data object or unique identifier.

At ACT 610, the local digital assistant can forward the prior audio input to the application. The local digital assistant can pass the prior audio input to the application. The local digital assistant can forward the indication of the prior audio input to the third-party application invoked by the local digital assistant. The local digital assistant can forward the indication of the prior audio input at the time of launching the application, while launching the application, or subsequent to launching the application. The third-party application can transmit, responsive to a content request triggered in the third-party application, the indication of the prior audio input to a digital component selector to execute a real-time content selection process based on the indication of the prior audio input.

Figure 7:
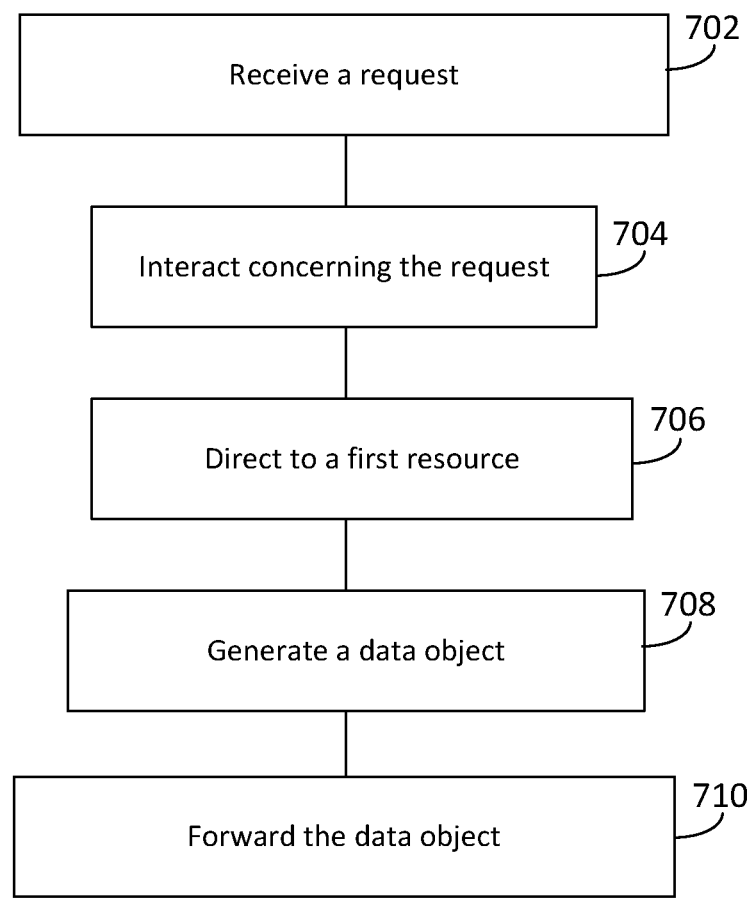
FIG. 7 is an illustration of a method of providing stateful information to an information resource, in accordance with an example.

FIG. 7 is an illustration of a method of providing stateful information to an information resource, in accordance with an example. The method 700 can be performed by one or more component or system depicted in FIG. 1, FIG. 2, FIG. 3 or FIG. 9. The method can be performed by one or more processors; one or more memory devices, the one or more memory devices storing instructions that when executed by the one or more processors cause the one or more processors to perform operations. The method 700 can be performed by one or more of the data processing system 102, computing device 104, remote digital assistant 112, digital component selector 120, local digital assistant 134, third-party application developer device 108, or digital component provider device 106. The method 700 can provide stateful information to on-line resources, such as a website, when a user visits a resource. When a user visits a website, the website that is visited may communicate with one or more further resources (such as digital component providers, content providers, information providers such as map servers, etc.) to assemble a web-page to present to the user via a computing device. The communications between the website and the further resources to assemble the website, and the communications between the website and the user's device to present the website to the user, both consume network resources and transmission bandwidth. Further, if the webpage presented to the user does not satisfy with the user's requirements the user will request changes—requiring further communication between the website and resources to assemble a revised version of the webpage, and re-presenting the revised version of the webpage to the user's device, thereby consuming further network resources.

At ACT 702, the method includes receiving, at a digital assistant (or other virtual assistant) implemented by one or more processors, a request from a user. A digital assistant can receive the request from the user. The request can be for a resource, such as a website, or an application. The digital assistant can receive the request via a voice-driven interface. The digital assistant can execute on a local computing device or a data processing system. The digital assistant can include both a local digital assistant and a remote digital assistant.

At ACT 704, the method includes interacting, by the virtual assistant and with the user, concerning the request. The digital assistant can interact with the user based on the request or to further the request. The interacting can include, for example, facilitating a conversation. The interacting can include providing feedback or information responsive to the request.

At ACT 706, the method includes directing, by the digital assistant and based on the interaction, the user to a first resource. The digital assistant can open, invoke, launch or execute the resource.

At ACT 708, the method includes generating, by the digital assistant, a data object representative of the interaction with the user leading to the directing, and representative of at least one event in the interaction that occurred before the digital assistant directed the user to the first resource. The data object can refer to a packaged data object of the conversation or interaction between the user and the digital assistant. The data object can include a token or unique identifier of the conversation.

At ACT 710, the method includes forwarding, by the digital assistant, the data object to the first resource. The digital assistant can pass or forward the data object (e.g., packaged data object, token, or unique ID) to the resource (e.g., application). The first resource can then obtain information about the interaction from the data object. The first resource can communicate with a second resource to obtain content for presentation to the user based on the information in the data object.

In some cases, a second resource can receive, from the first resource, the data object. The second resource can obtain information about the interaction from the data object. The second resource can be different from the first resource. The second resource can be a different application or website as compared to the first resource. The data object can be opaque to the first resource such that the first resource cannot parse or process the data object to identify the information about the interaction.

For example, the user can visit the first resource as a result of the interaction between the user and the digital assistant. The details of the interaction can provide stateful information as to why the user is visiting the first resource. Stateful information can include or refer to information concerning preceding events or user interactions that lead to the user being directed to the resource. The digital assistant can provide a data object representative of the interaction with the user. As a result, information about the user's interaction leading to the user being directed to the first resource can be made available to the first resource or to one or more other resources. This information can then be used to make the procedure of, for example, assembling a webpage and presenting the webpage to the user more resource efficient. Using this information to assemble the webpage may for example avoid the need for the user device to re-supply information the user device has already supplied to the digital assistant, since the first resource or the other resource(s) can obtain this information from the data object provided by the digital assistant, thereby providing a reduction in required network resources. Additionally or alternatively, the communications between the first resource and other resources needed to assemble the web-page can be reduced, by making use of the information from the data object.

The data object or packaged data object may for example be representative of one of the following: i) a summary of the interaction; ii) a compact version of the interaction; iii) a list of principal events in the interaction; or iv) a complete or substantially complete record of the interaction.

In some cases, rather than provide the data object to the resource, the digital assistant can provide a unique ID to the resource that corresponds to the data object. The digital assistant can store the data object in a data repository and map the data object to the unique ID. The digital assistant sends the first resource the unique identifier that allows the data object to be retrieved from the server.

For example, the method can include receiving, at a digital assistant, a request from a user; interacting, by the digital assistant and with the user, concerning the request; sending, by the digital assistant and based on the interaction, the user to a first resource; generating, by the digital assistant, a data object representative of the interaction with the user leading to the sending; generating, by the digital assistant, an identifier identifying the interaction; forwarding, by the digital assistant, the identifier to the first resource; and forwarding, by the digital assistant, the data object to a server remote from the resource.

The method can include the first resource identifying the remote server from the identifier and sending a request for the data object to the remote server. The first resource can obtain information about the interaction from the data object. The first resource can communicate with a second resource to obtain content for presentation to the user based on the information in the data object.

In some cases, a second resource can receive, from the first resource, the identifier, and identify the remote server from the identifier. The second resource can obtain the data object from the remote server. The second resource can obtain information about the interaction from the data object. The data object can be opaque to the first resource.

The second resource can send, based on the obtained information about the interaction, one or more content items to the first resource for presentation to the user. The content items can be included in a webpage or other graphical user interface or audio interface.

Figure 8:
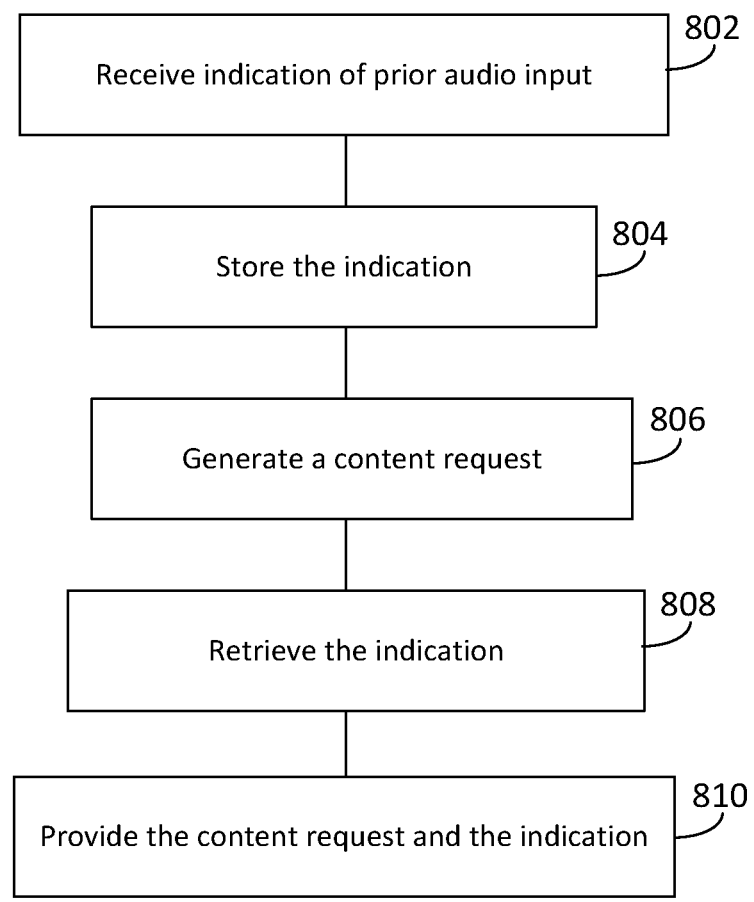
FIG. 8 is an illustration of a method of transferring data in a secure processing environment, in accordance with an example.

FIG. 8 is an illustration of a method of transferring data in a secure processing environment. The method 800 can be performed by one or more component or system depicted in FIG. 1, FIG. 2, FIG. 3 or FIG. 9. The method 800 can include receiving an indication of prior audio input at ACT 802. A third-party application executing on a computing device can receive the indication of the prior audio input. The third-party application can receive the indication of the prior audio input from a local digital assistant executing on the computing device. The third-party application can be configured with an application programming interface of software development kit that allows the third-party application to receive the indication of the prior audio input. The prior audio input can correspond to prior audio input detected by a microphone of the computing device prior to reception of audio input that resulted in invocation of the third-party application.

The local digital component can be in communication with a remote digital assistant component via a communication channel to processes input audio signals to invoke the third-party application. For example, the local digital component can facilitate a conversation with an end user. The local digital assistant can communicate with the remote digital assistant to facilitate the conversation. For example, the local digital assistant can detect audio input from the end user, generate a query, transmit the query to the remote digital assistant, receive a response to the query from the remote digital assistant, and then present the response to the end user.

The third-party application can execute on the computing device in a secure processing environment managed by the computing device. In some cases, the secure processing environment can refer to identifying, obtaining, accessing or providing configuration settings that are designed or constructed to restrict access for the third-party application. For example, the third-party application can be restricted from accessing one or more functions or data on the computing device. By restricting what the application can access, the computing device can protect other components or data stored or executed on the computing device. The secure processing environment can be initially configured to prevent access to the prior audio input processed by the local digital assistant component.

In some cases, the indication of the prior audio input can include a packaged data object. The packaged data object can include the prior audio input detected by the microphone prior to the reception of the audio input that resulted in the invocation of the third-party application. The packaged data object can include a structured conversation, serialized opaque token, or event identifier. The packaged data object can be generated by the local digital assistant component responsive to the invocation of the third-party application.

In some cases, the indication of the prior audio input can include a unique identifier that corresponds to the prior audio input or the packaged data object. For example, the packaged data objection, prior audio input or conversation can be stored on a remote server, such as a data processing system. The data processing system can include a mapping of the unique identifier to the prior audio input (or packaged data object or conversation). The data processing system can provide the unique identifier to the third-party application rather than the packaged data object. Providing the unique identifier rather than or instead of the conversation itself (or packaged data object or structured conversation), can reduce network bandwidth usage or memory usage on the computing device.

At ACT 804, the third-party application can store the received indication of the prior audio input in memory. The third-party application can store the received indication of the prior audio input in memory of the computing device. In some cases, since the third-party application may be executing in a secure processing environment that allocated only certain memory for use by the third-party application, the third-party application can store the indication of the prior audio input in the secure processing environment, or memory thereof.

At ACT 806, the third-party application can generate a content request. The third-party application can generate the content request responsive to an event. The event can occur in the third-party application. The event can include or refer to a user interaction. The event can include or refer to a page, level, action, screen, condition, temporal condition, geographic condition, sensor input, or other trigger in the third-party application. In some cases, a developer of the third-party application can configure, establish or set up the event.

The third-party application can include a script embedded in the third-party application that triggers or generates the content request responsive to the event.

At ACT 808, the third-party application can retrieve the indication of the prior audio input. The third-party application can retrieve the indication of the prior audio input responsive to the event. The third-party application can retrieve the indication of the prior audio input responsive to generation of the content request. The third-party application can retrieve the indication of the prior audio input from memory. The third-party application can retrieve the indication of the prior audio input from the secure processing environment.

In some cases, the third-party application can retrieve the indication of the prior audio input and generate the content request to include the indication of the prior audio input. For example, generating the content request can include retrieving the indication of the prior audio input and then combining or embedding the indication with the content request, or otherwise including the indication of the prior audio input with the content request.

At ACT 810, the third-party application provides the content request and the indication. The content request can include the indication of the prior audio input. The third-party application can provide the content request and the indication of the prior audio input using one or more transmissions or data packets. The third-party application can provide the content request and the indication of the prior audio input to a digital component selector. The digital selector, responsive to receiving the content request, can execute a real-time content selection process based on the content request and the indication of the prior audio input.

In some cases, the indication of the prior audio input can include the unique identifier. The third-party application can receive, from the local digital assistant component, the unique identifier corresponding to the prior audio input. The third-party application can provide, responsive to the content request generated in the third-party application, the unique identifier to the digital component selector. The third-party application can transmit the unique identifier and the content request to the digital component selector. The digital component selector can perform a lookup in a database using the unique identifier to identify the prior audio input. The third-party application can receive, from the digital component selector for presentation, a digital component selected via the real-time content selection process based on the prior audio input corresponding to the unique identifier.

The third-party application can receive the selected digital component. The third-party application can receive the selected digital component subsequent to transmission of the content request and the indication of the prior audio input. The third-party application can presenting, via the computing device, the digital component. The third-party application can present, via audio output by the computing device, the digital component.

In some cases, the third-party application can transmit the selected and received digital component to another application or device for presentation. For example, the third-party application can be a first third-party application executing on a first computing device. The first third-party application can be in communication with a second third-party application. The second third-party application can execute on the same first computing device or a second computing device that is separate from the first computing device. The second third-party application can be a different type of application as compared to the first third-party application. The first and second third-party applications can be provided by a same application developer. The second third-party application can be related to the first third-party application. The second third-party application can be a version of the first third-party application. For example, the first third-party application can be configured for a smartphone, whereas the second third-party application can be configured for a laptop or a smartwatch.

The first third-party application can transmit the received digital component to the second third-party application to cause the second third-party application to present the digital component. The first third-party application can transmit the received digital component via a communication channel. In some cases, the first third-party application can transmit an instruction to the computing device, local digital assistant, remote digital assistant, digital component selector, or data processing system. The instruction can include an instruction to transmit the selected digital component to the second third-party application. For example, rather than the first third-party application transmit the digital component to the second third-party application on a second computing device, the first third-party application can instruct the data processing system to transmit the digital component to the second third-party application executed by the second computing device.

In some cases, the third-party application can be authorized to use the indication of the prior audio input. The third-party application can parse the indication of the prior audio input (e.g., aspects of the conversation) to modify content of the third-party application. For example, the third-party application can select a theme, logic flow, screen, format, font, subject, topic, or other aspect based on information associated with the prior audio input.

Figure 9:
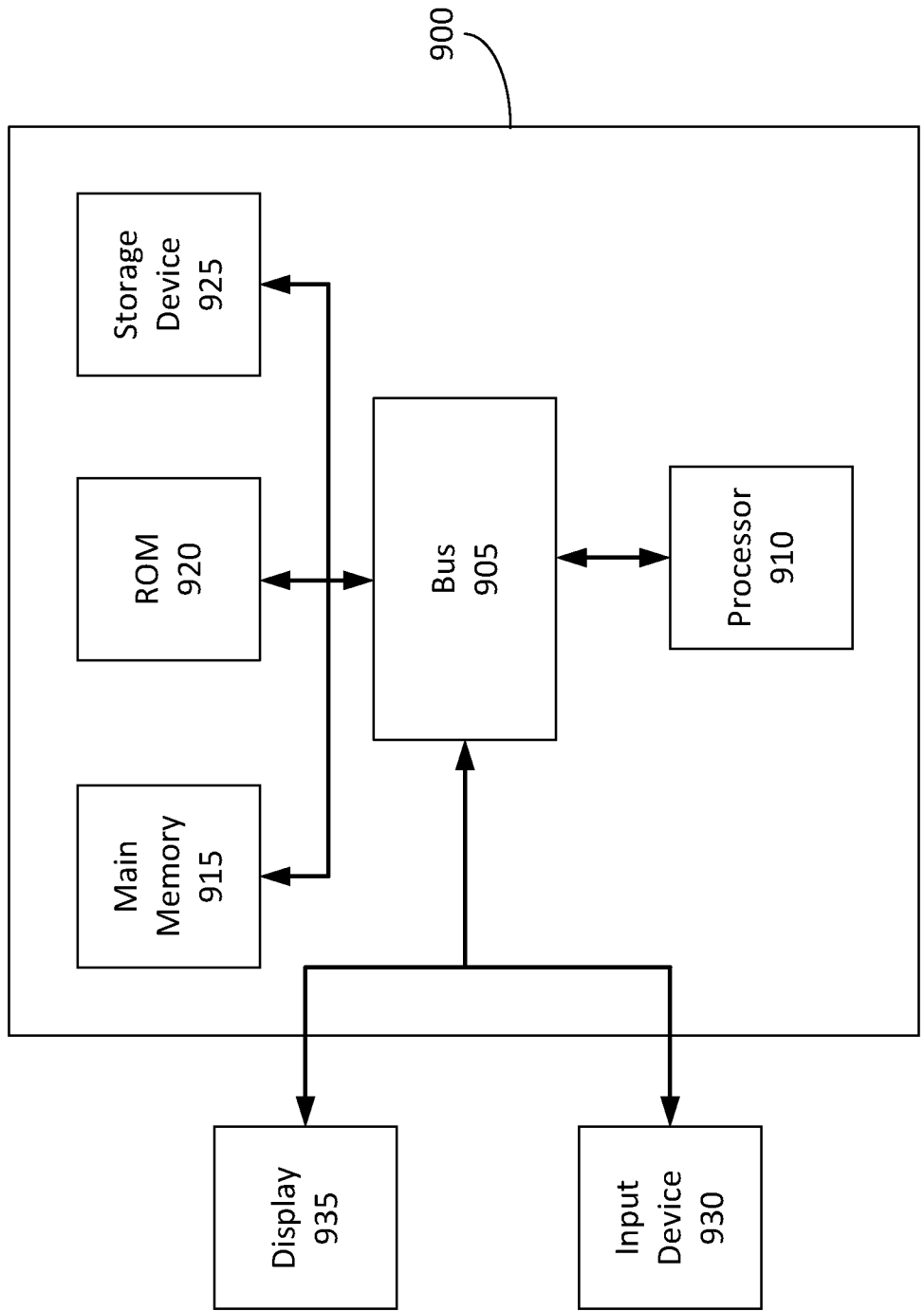
FIG. 9 is a block diagram illustrating a general architecture for a computer system that can be employed to implement elements of the systems and methods described and illustrated herein, including, for example, the systems depicted in FIGS. 1-3, and the methods depicted in FIGS. 4-8.

FIG. 9 is a block diagram of an example computer system 900. The computer system or computing device 900 can include or be used to implement the system 100, or its components such as the data processing system 102. The data processing system 102 can include an intelligent personal assistant or voice-based digital assistant. The computing system 900 includes a bus 905 or other communication component for communicating information and a processor 910 or processing circuit coupled to the bus 905 for processing information. The computing system 900 can also include one or more processors 910 or processing circuits coupled to the bus for processing information. The computing system 900 also includes main memory 915, such as a random access memory (RAM) or other dynamic storage device, coupled to the bus 905 for storing information, and instructions to be executed by the processor 910. The main memory 915 can be or include the data repository 124. The main memory 915 can also be used for storing position information, temporary variables, or other intermediate information during execution of instructions by the processor 910. The computing system 900 may further include a read-only memory (ROM) 920 or other static storage device coupled to the bus 905 for storing static information and instructions for the processor 910. A storage device 925, such as a solid-state device, magnetic disk or optical disk, can be coupled to the bus 905 to persistently store information and instructions. The storage device 925 can include or be part of the data repository 124.

The computing system 900 may be coupled via the bus 905 to a display 935, such as a liquid crystal display, or active matrix display, for displaying information to a user. An input device 930, such as a keyboard including alphanumeric and other keys, may be coupled to the bus 905 for communicating information and command selections to the processor 910. The input device 930 can include a touch screen display 935. The input device 930 can also include a cursor control, such as a mouse, a trackball, or cursor direction keys, for communicating direction information and command selections to the processor 910 and for controlling cursor movement on the display 935. The display 935 can be part of the data processing system 102, the client computing device 150 or other component of FIG. 1, for example.

The processes, systems and methods described herein can be implemented by the computing system 900 in response to the processor 910 executing an arrangement of instructions contained in main memory 915. Such instructions can be read into main memory 915 from another computer-readable medium, such as the storage device 925. Execution of the arrangement of instructions contained in main memory 915 causes the computing system 900 to perform the illustrative processes described herein. One or more processors in a multi-processing arrangement may also be employed to execute the instructions contained in main memory 915. Hard-wired circuitry can be used in place of or in combination with software instructions together with the systems and methods described herein. Systems and methods described herein are not limited to any specific combination of hardware circuitry and software.

Although an example computing system has been described in FIG. 9, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. For example, the interface 110, remote application launcher 116, digital component selector 120, or NLP component 114 and other data processing system 102 components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 900 can include clients and servers. A client and server are generally remote from each other and typically interact through a communication network (e.g., the network 105). The relationship of client and server arises by virtue of computer programs running on the respective computers and having a client-server relationship to each other. In some implementations, a server transmits data (e.g., data packets representing a digital component) to a client device (e.g., for purposes of displaying data to and receiving user input from a user interacting with the client device). Data generated at the client device (e.g., a result of the user interaction) can be received from the client device at the server (e.g., received by the data processing system 102 from the computing device 104 or the digital component provider device 106 or the third-party application developer device 108).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 114 or the digital component selector 120, can be a single component, app, or program, or a logic device having one or more processing circuits, or part of one or more servers of the data processing system 102.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. For example, the computing device 104 can generate the packaged data object and forward it to the third-party application when launching the application. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system to transfer data in a secure processing environment, comprising:
   a data processing system comprising one or more processors and memory;
   a digital assistant component executed at least partially by the data processing system to:
      receive audio input detected by a microphone of a computing device;
      determine, based on the audio input, to invoke a third-party application associated with the computing device;
      generate, responsive to the determination to invoke the third-party application, a packaged data object comprising prior audio input detected by the microphone prior to reception of the audio input that resulted in invocation of the third-party application, the packaged data object configured to provide audio context in a tokenized format, the packaged data object comprising at least one of: a structured conversation, a token or unique identifier of a conversation, or an event identifier; and
      forward, to the third-party application invoked by the digital assistant component to execute in a secure processing environment on the computing device, the packaged data object, the third-party application configured to transmit, responsive to a content request triggered in the third-party application, the packaged data object to a digital component selector to execute a real-time digital component selection process based on the packaged data object.

2. The system of claim 1, comprising the digital assistant component to:
   identify, via a lookup in a database, a deep-link for the third-party application; and
   use the deep-link to invoke the third-party application.

3. The system of claim 1, comprising the digital component selector to:
   receive the packaged data object and the content request;
   select, responsive to the content request, via the real-time content selection process, a digital component based on the packaged data object; and
   transmit, to the computing device, the digital component for presentation via the third-party application executed in the secure processing environment on the computing device.

4. The system of claim 1, comprising the digital component selector to:
   select, responsive to the content request, via the real-time content selection process, a digital component based on the packaged data object; and
   transmit, to the digital assistant component, the digital component for presentation by the digital assistant component separate from the third-party application executed in the secure processing environment on the computing device.

5. The system of claim 1, comprising the data processing system to:
   transmit, for presentation via the computing device, a digital component selected based on the packaged data object;
   receive, by the data processing system, an indication of an interaction with the digital component presented via the computing device; and
   attribute, by the data processing system, the interaction with the digital component to the digital assistant component.

6. The system of claim 1, comprising the data processing system to instruct the computing device to launch the third-party application in the secure processing environment, wherein the secure processing environment is initially configured to prevent access to the prior audio input processed by the digital assistant component.

7. The system of claim 1, comprising the digital assistant component to generate the packaged data object comprising the structured conversation.

8. The system of claim 1, comprising the digital assistant component to generate the packaged data object comprising a serialized opaque token.

9. The system of claim 1, comprising the digital assistant component to generate the packaged data object comprising event identifiers indicating events in the prior audio input.

10. The system of claim 1, comprising the digital assistant component to generate the packaged data object comprising event identifiers formed from a query and a response to the query.

11. A method of transferring data in a secure processing environment, comprising:
    receiving, by a digital assistant component executed at least partially by a data processing system comprising one or more processors and memory, audio input detected by a microphone of a computing device;
    determining, by the data processing system based on the audio input, to invoke a third-party application associated with the computing device;
    generating, by the data processing system responsive to the determination to invoke the third-party application, a packaged data object comprising prior audio input detected by the microphone prior to reception of the audio input that resulted in invocation of the third-party application, the packaged data object configured to provide audio context in a tokenized format, the packaged data object comprising at least one of: a structured conversation, a token or unique identifier of a conversation, or an event identifier; and
    forwarding, by the data processing system, to the third-party application invoked by the digital assistant component to execute in a secure processing environment on the computing device, the packaged data object, the third-party application configured to transmit, responsive to a content request triggered in the third-party application, the packaged data object to a digital component selector to execute a real-time content selection process based on the packaged data object.

12. The method of claim 11, comprising:
    identifying, by the data processing system via a lookup in a database, a deep-link for the third-party application; and
    using, by the data processing system, the deep-link to invoke the third-party application.

13. The method of claim 11, comprising:
    providing, to the digital component selector, the packaged data object and the content request, the digital component selector configured to select, responsive to the content request, via the real-time content selection process, a digital component based on the packaged data object; and
    providing, via the data processing system to the computing device, the digital component for presentation via the third-party application executed in the secure processing environment on the computing device.

14. The method of claim 11, comprising:
    selecting, by the digital component selector, responsive to the content request, via the real-time content selection process, a digital component based on the packaged data object; and
    transmitting, by the digital component selector to the digital assistant component, the digital component for presentation by the digital assistant component separate from the third-party application executed in the secure processing environment on the computing device.

15. The method of claim 11, comprising:
    transmitting, for presentation via the computing device, a digital component selected based on the packaged data object;
    receiving, by the data processing system, an indication of an interaction with the digital component presented via the computing device; and
    attributing, by the data processing system, the interaction with the digital component to the digital assistant component.

16. The method of claim 11, comprising:
    instructing, by the data processing system, the computing device to launch the third-party application in the secure processing environment, wherein the secure processing environment is initially configured to prevent access to the prior audio input processed by the digital assistant component.

17. The method of claim 11, comprising:
    generating, by the digital assistant component, the packaged data object comprising the structured conversation.

18. The method of claim 11, comprising:
    generating, by the digital assistant component, the packaged data object comprising a serialized opaque token.

19. The method of claim 11, comprising:
    generating, by the digital assistant component, the packaged data object comprising event identifiers indicating events in the prior audio input.

20. The method of claim 11, comprising:
generating, by the digital assistant component, the packaged data object comprising event identifiers formed from a query and a response to the query.

* * * * *